United States Patent
Ramasubramonian et al.

(10) Patent No.: US 12,444,088 B2
(45) Date of Patent: Oct. 14, 2025

(54) ANGULAR MODE AND IN-TREE QUANTIZATION IN GEOMETRY POINT CLOUD COMPRESSION

(71) Applicant: QUALCOMM Incorporated, San Diego, CA (US)

(72) Inventors: Adarsh Krishnan Ramasubramonian, Irvine, CA (US); Bappaditya Ray, San Diego, CA (US); Geert Van der Auwera, Del Mar, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 597 days.

(21) Appl. No.: 17/495,621

(22) Filed: Oct. 6, 2021

(65) Prior Publication Data
US 2022/0108488 A1    Apr. 7, 2022

Related U.S. Application Data

(60) Provisional application No. 63/091,821, filed on Oct. 14, 2020, provisional application No. 63/090,629, (Continued)

(51) Int. Cl.
*G06T 9/00* (2006.01)
*G01S 17/89* (2020.01)
*G06T 9/40* (2006.01)

(52) U.S. Cl.
CPC .............. *G06T 9/001* (2013.01); *G01S 17/89* (2013.01); *G06T 9/40* (2013.01)

(58) Field of Classification Search
CPC ......... G01S 17/89; G06T 9/001; G06T 9/005; G06T 9/40; H04N 19/124; H04N 19/13; H04N 19/597
See application file for complete search history.

(56) References Cited

U.S. PATENT DOCUMENTS 5,706,009 A * 1/1998 Kondo ................... H04N 19/63
                                                    341/200
5,982,313 A * 11/1999 Brooks ................. H03M 1/145
                                                    341/143
(Continued)

FOREIGN PATENT DOCUMENTS

CN          111133476 A        5/2020
CN          114503440 A        5/2022
(Continued)

OTHER PUBLICATIONS

International Search Report and Written Opinion—PCT/US2021/054003—ISA/EPO—Jan. 31, 2022 11 Pages.
(Continued)

*Primary Examiner* — Peter D Le
(74) *Attorney, Agent, or Firm* — QUALCOMM Incorporated; Espartaco Diaz Hidalgo

(57) ABSTRACT

A device for decoding a bitstream that includes point cloud data can be configured to determine, based on syntax signaled in the bitstream, that in-tree quantization is enabled for a node; determine, for the node based on the syntax signaled in the bitstream, that an angular mode is activated for the node; in response to in-tree quantization being enabled for the node, determine for the node a quantized value representing a coordinate position relative to an origin position; scale the quantized value without clipping to determine a scaled value representing the coordinate position relative to the origin position; and determine a context for context decoding a plane position syntax element for the angular mode based on the scaled value representing the coordinate position relative to the origin position.

55 Claims, 14 Drawing Sheets

Related U.S. Application Data filed on Oct. 12, 2020, provisional application No. 63/088,938, filed on Oct. 7, 2020.

(56) References Cited

U.S. PATENT DOCUMENTS

| | | | | |
|---|---|---|---|---|
| 2003/0081674 | A1* | 5/2003 | Malvar | H04N 19/126 375/240.18 |
| 2004/0081340 | A1* | 4/2004 | Hashimoto | A61B 8/463 382/128 |
| 2006/0228034 | A1* | 10/2006 | Mizuno | H04N 19/17 375/E7.182 |
| 2008/0238919 | A1* | 10/2008 | Pack | G06T 15/04 345/582 |
| 2013/0114675 | A1* | 5/2013 | Guo | H04N 19/13 375/E7.138 |
| 2013/0142257 | A1* | 6/2013 | Wang | H04N 19/172 375/240.12 |
| 2013/0266233 | A1* | 10/2013 | Kondo | H04N 19/126 382/233 |
| 2014/0091201 | A1* | 4/2014 | Zhang | H03M 1/201 341/156 |
| 2014/0124004 | A1* | 5/2014 | Rosenstein | A47L 11/4061 15/3 |
| 2018/0341836 | A1* | 11/2018 | Lim | G06F 18/2413 |
| 2018/0356523 | A1* | 12/2018 | England | G06Q 10/06 |
| 2019/0080483 | A1* | 3/2019 | Mammou | G06T 7/50 |
| 2019/0206128 | A1* | 7/2019 | Logan | H04N 21/21805 |
| 2019/0246102 | A1* | 8/2019 | Cho | G06N 3/045 |
| 2020/0153885 | A1 | 5/2020 | Lee et al. | |
| 2021/0209811 | A1 | 7/2021 | Ramasubramonian et al. | |
| 2021/0218994 | A1* | 7/2021 | Flynn | G06T 9/001 |
| 2021/0326710 | A1* | 10/2021 | Wang | H03M 7/6005 |
| 2021/0329055 | A1* | 10/2021 | Hur | H04L 65/61 |
| 2021/0409714 | A1 | 12/2021 | Ramasubramonian et al. | |
| 2022/0256151 | A1* | 8/2022 | Tsukuba | H04N 19/176 |
| 2022/0327745 | A1* | 10/2022 | Iguchi | G06T 9/40 |
| 2022/0351423 | A1 | 11/2022 | Martin-Cocher et al. | |
| 2023/0046917 | A1* | 2/2023 | Flynn | H04N 19/96 |
| 2023/0053544 | A1* | 2/2023 | Flynn | H04N 19/126 |
| 2023/0260163 | A1* | 8/2023 | Lee | G06T 9/40 345/419 |

FOREIGN PATENT DOCUMENTS

| | | |
|---|---|---|
| CN | 114586287 A | 6/2022 |
| CN | 116057579 A | 5/2023 |
| EP | 3800886 A1 | 4/2021 |
| EP | 3800892 A1 | 4/2021 |
| WO | 2020101021 A1 | 5/2020 |
| WO | 2021062528 A1 | 4/2021 |
| WO | 2021065536 A1 | 4/2021 |
| WO | 2021262939 | 12/2021 |

OTHER PUBLICATIONS

Flynn (Apple) D., et al., "G-PCC: Minor Simplifications and Fixes to in-Tree Geometry Quantisation," 129. MPEG Meeting, Jan. 13-Jan. 17, 2020, Brussels, (Motion Picture Expert Group or ISO/IEC JTC1/SC29/WG11), No. M52521, Jan. 11, 2020, XP030225213, 4 Pages.

"G-PCC Codec Description V7," 130. MPEG Meeting, Apr. 20-Apr. 24, 2020, Alpbach, (Motion Picture Expert Group or ISO/IEC JTC1/SC29/WG11), No. N19331, Jun. 25, 2020, XP030289576, 119 Pages.

Ramasubramonian (Qualcomm) A.K., et al., "[G-PCC] [New proposal] on In-Tree Quantization and Angular Mode," 132. MPEG Meeting, Oct. 12-Oct. 16, 2020, Online, (Motion Picture Expert Group or ISO/IEC JTC1/SC29/ WG11), No. M55387, Oct. 15, 2020, XP030291906, 18 Pages.

Ramasubramonian (Qualcomm) A.K., et al., "[G-PCC] [New proposal] on In-Tree Quantization and Angular Mode," 132. MPEG Meeting, Oct. 12-Oct. 16, 2020, Online, (Motion Picture Expert Group or ISO/IEC JTC1/SC29/ WG11), No. M55387, Oct. 7, 2020 (Oct. 7, 2020), XP030292910, 8 Pages.

Lasserre S., et al., "CE 13.22 Report on Angular Mode", m51594, BlackBerry, 2016, 33 Pages.

Ramasubramonian A.K., et al., "[G-PCC][New proposal] on In-Tree Quantization and Angular Mode", ISO/IEC JTC 1/SC 29/WG 7, m55387-v2, Online—Oct. 2020, pp. 1-15.

Taiwan Search Report—TW110137317—TIPO—Apr. 9, 2025.

* cited by examiner

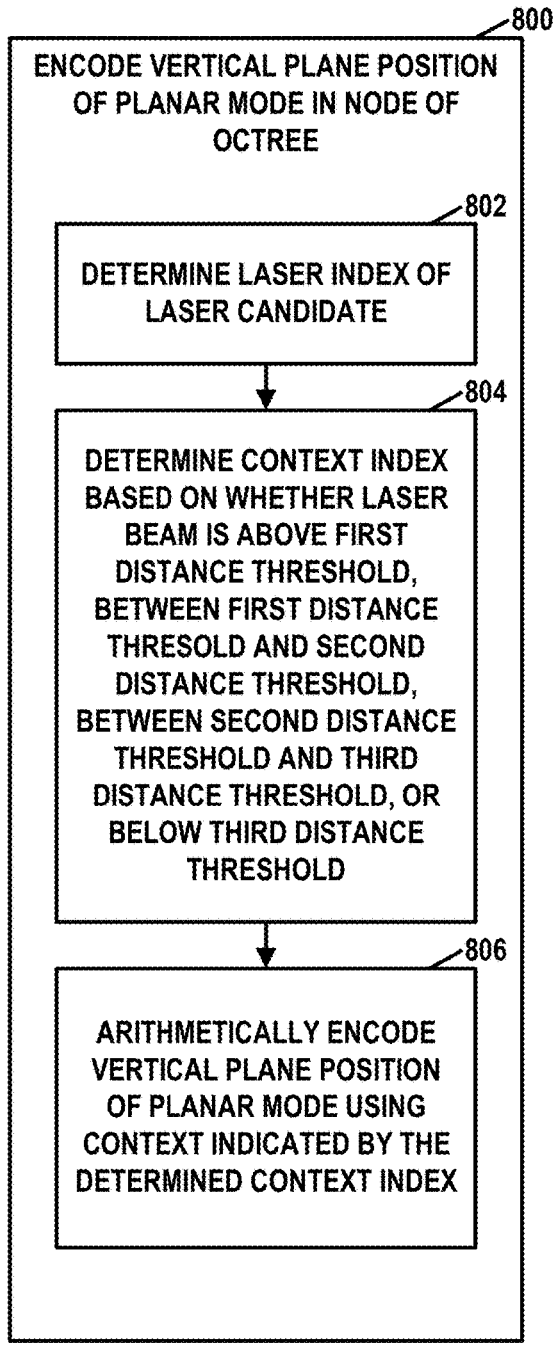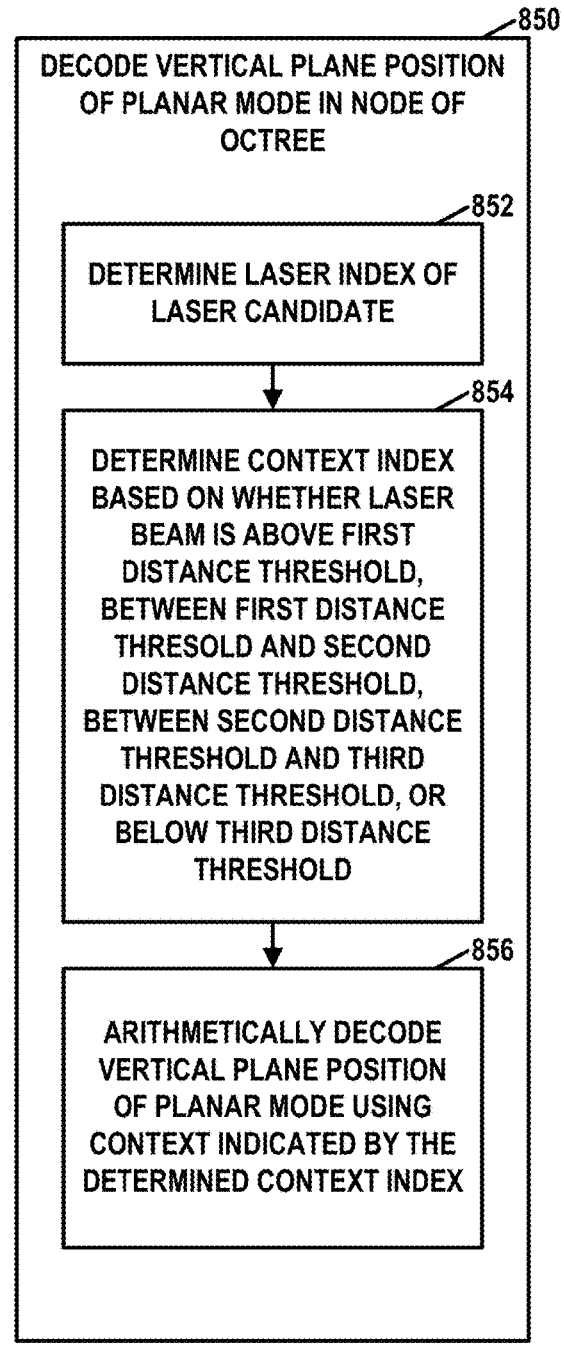
FIG. 8A
FIG. 8B

ANGULAR MODE AND IN-TREE QUANTIZATION IN GEOMETRY POINT CLOUD COMPRESSION

This application claims the benefit of:

U.S. Provisional Patent Application 63/088,938, filed 7 Oct. 2020;

U.S. Provisional Patent Application 63/090,629, filed 12 Oct. 2020; and

U.S. Provisional Patent Application 63/091,821, filed 14 Oct. 2020, the entire content of all being incorporated herein by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In regular coding of a point cloud frame, angular mode provides considerable gain to coding efficiency. However, when in-tree quantization is enabled, the gain achieved from angular mode reduces considerably, and in some cases, even produces a loss. For the angular mode, the quantized bits are used for context derivation, and the quantized bits are in a different scale space and not in the same domain as the original points. This reduces the usefulness of both angular mode and in-tree quantization, and thus, may not be beneficial to enable both at the same time.

This disclosure describes techniques for, when angular mode and in-tree quantization are used together, deriving a scaled value xS from a point/position coordinate value x to derive a position of the node/point with respect to a lidar origin. More specifically, by scaling a quantized value representing the coordinate value without clipping, a G-PCC decoder may determine a scaled value representing the coordinate position relative to the origin position in a manner that puts the scaled value into the same scale space as the original point value with enough accuracy to achieve coding gains from angular mode in conjunction with in-tree quantization.

According to one example, a device for decoding a bitstream that includes point cloud data, the device comprising: a memory to store the point cloud data; and one or more processors coupled to the memory and implemented in circuitry, the one or more processors configured to: determine, based on syntax signaled in the bitstream, that in-tree quantization is enabled for a node; determine, for the node based on the syntax signaled in the bitstream, that an angular mode is activated for the node; in response to in-tree quantization being enabled for the node, determine for the node a quantized value representing a coordinate position relative to an origin position; scale the quantized value without clipping to determine a scaled value representing the coordinate position relative to the origin position; and determine a context for context decoding a plane position syntax element for the angular mode based on the scaled value representing the coordinate position relative to the origin position.

According to another example, a method for decoding a bitstream that includes point cloud data, the method comprising: determining, based on syntax signaled in the bitstream, that in-tree quantization is enabled for a node; determining, for the node based on the syntax signaled in the bitstream, that an angular mode is activated for the node; in response to in-tree quantization being enabled for the node, determining for the node a quantized value representing a coordinate position relative to an origin position; scaling the quantized value without clipping to determine a scaled value representing the coordinate position relative to the origin position; and determining a context for context decoding a plane position syntax element for the angular mode based on the scaled value representing the coordinate position relative to the origin position.

According to another example, a device for encoding a bitstream that includes point cloud data, the device comprising: a memory to store the point cloud data; and one or more processors coupled to the memory and implemented in circuitry, the one or more processors configured to: determine that in-tree quantization is enabled for a node; determine that an angular mode is activated for the node; in response to in-tree quantization being enabled for the node, determine for the node a quantized value representing a coordinate position relative to an origin position; scale the quantized value without clipping to determine a scaled value representing the coordinate position relative to the origin position; and determine a context for context encoding a plane position syntax element for the angular mode based on the scaled value representing the coordinate position relative to the origin position.

According to another example, a method for encoding a bitstream that includes point cloud data, the method comprising: determining that in-tree quantization is enabled for a node; determining that an angular mode is activated for the node; in response to in-tree quantization being enabled for the node, determining for the node a quantized value representing a coordinate position relative to an origin position; scaling the quantized value without clipping to determine a scaled value representing the coordinate position relative to the origin position; and determining a context for context encoding a plane position syntax element for the angular mode based on the scaled value representing the coordinate position relative to the origin position.

According to another example, a computer-readable storage medium storing instructions that when executed by one or more processors cause the one or more processors to: determine, based on syntax signaled in the bitstream, that in-tree quantization is enabled for a node; determine, for the node based on the syntax signaled in the bitstream, that an angular mode is activated for the node; in response to in-tree quantization being enabled for the node, determine for the node a quantized value representing a coordinate position relative to an origin position; scale the quantized value without clipping to determine a scaled value representing the coordinate position relative to the origin position; and determine a context for context decoding a plane position syntax element for the angular mode based on the scaled value representing the coordinate position relative to the origin position.

According to another example, a device for decoding a bitstream that includes point cloud data, the device comprising: means for determining, based on syntax signaled in the bitstream, that in-tree quantization is enabled for a node; means for determining, for the node based on the syntax signaled in the bitstream, that an angular mode is activated for the node; means for determining for the node a quantized value representing a coordinate position relative to an origin position in response to in-tree quantization being enabled for the node; means for scaling the quantized value without clipping to determine a scaled value representing the coordinate position relative to the origin position; and means for determining a context for context decoding a plane position syntax element for the angular mode based on the scaled value representing the coordinate position relative to the origin position.

The details of one or more examples are set forth in the accompanying drawings and the description below. Other features, objects, and advantages will be apparent from the description, drawings, and claims.

BRIEF DESCRIPTION OF DRAWINGS

FIG. 8A is a flowchart illustrating an example operation for encoding a vertical plane position.

FIG. 8B is a flowchart illustrating an example operation for decoding a vertical plane position.

DETAILED DESCRIPTION

Figure 1:
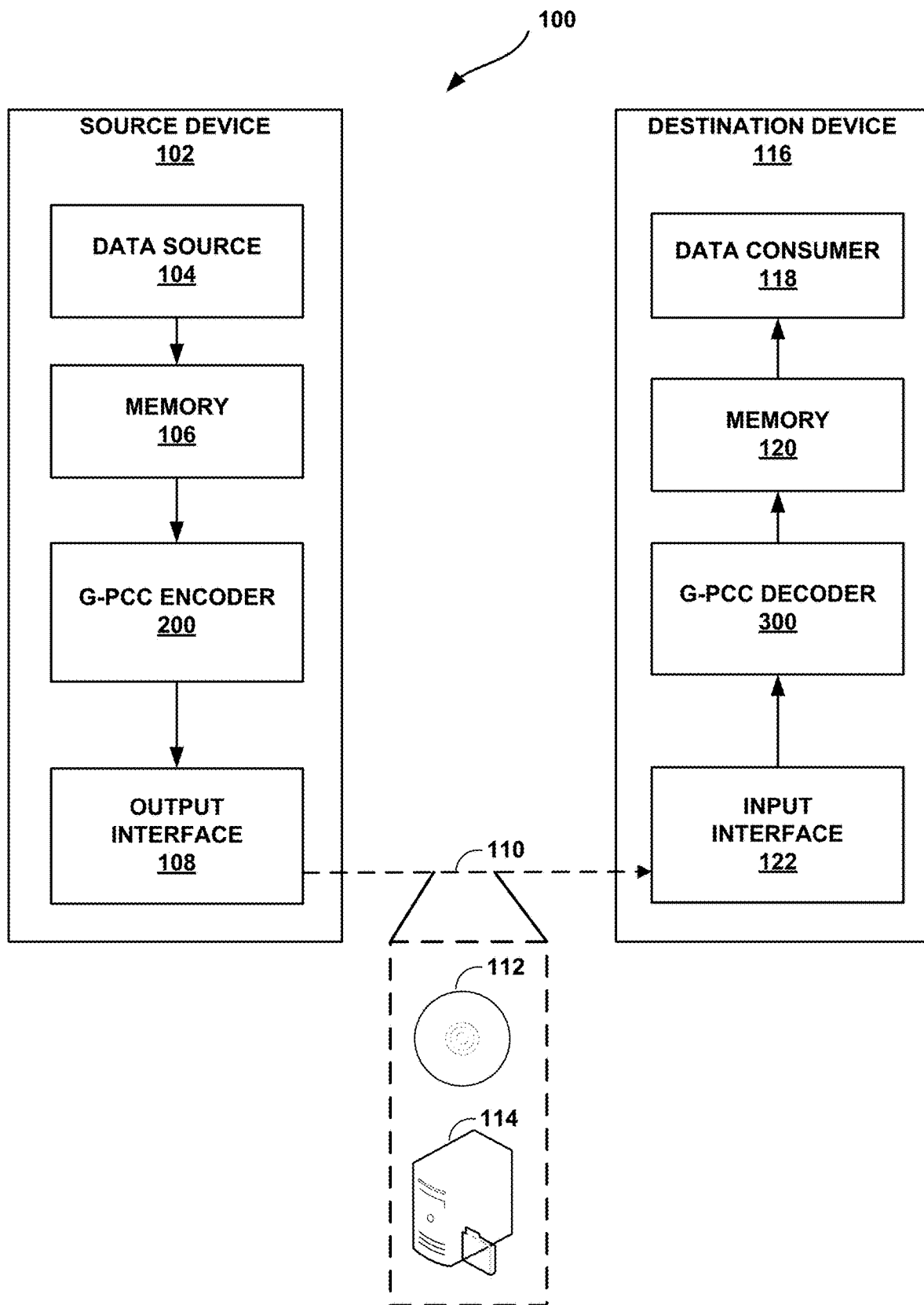
FIG. 1 is a block diagram illustrating an example encoding and decoding system that may perform the techniques of this disclosure.

ISO/IEC MPEG (JTC 1/SC 29/WG 11), and more recently ISO/IEC MPEG 3 DG (JTC 1/SC 29/WG 7), have studied the standardization of point cloud coding technology with a compression capability that potentially exceeds that of existing approaches. The group formerly known as MPEG, which has now dissolved and split into individual working groups, is working together on this exploration activity in a collaborative effort known as the 3-Dimensional Graphics Team (3DG) to evaluate compression technology designs proposed by experts in this area.

Point cloud compression activities are typically categorized into two different approaches. The first approach is "Video point cloud compression" (V-PCC), which involves segmenting a 3D object and projecting the segments in multiple 2D planes (which are represented as "patches" in the 2D frame), which are further coded by a legacy 2D video codec such as HEVC. The second approach is "Geometry point cloud compression" (G-PCC), which involves directly compressing 3D geometry, i.e., the position of a set of points in 3D space and associated attribute values (for each point associated with the 3D geometry). G-PCC addresses the compression of point clouds in both Category 1 (static point clouds) and Category 3 (dynamically acquired point clouds).

A point cloud contains a set of points in a 3D space and may have attributes associated with the points. The attributes may, for example, be color information such as R/G/B, Y/Cb/Cr, reflectance information, or other such attributes. Point clouds may be captured by a variety of cameras or sensors such as light detection and ranging (LIDAR) scanners or 3D scanners and may also be computer-generated. Point cloud data can be used in a variety of applications including, but not limited to, construction (e.g., modelling), graphics (e.g., 3D models for visualizing and animation), and the automotive industry (e.g., LIDAR sensors used to help in navigation).

The 3D space occupied by point cloud data may be enclosed by a virtual bounding box. The positions of the points in the bounding box may be represented by a certain precision. Thus, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles, and each tile may be coded into one or more slices. The partitioning of the bounding box into slices and tiles may be based on the number of points in each partition or based on other considerations, such as coding a particular region as tiles. Slice regions may be further partitioned using splitting decisions similar to those in video codecs.

G-PCC encoders and decoders may support a planar coding mode and an angular coding mode, which may also be referred to as planar mode and angular mode, respectively. Planar mode is a technique that may improve coding of which nodes are occupied. Planar mode may be used when all occupied child nodes of a node are adjacent to a plane and on a side of the plane associated with increasing coordinate values for a dimension orthogonal to the plane. For instance, planar mode may be used for a node when all occupied child nodes of the node are above or below a horizontal plane passing through a center point of the node, or planar mode may be used for a node when all occupied child nodes of the node are on a close side or a farther side of a vertical plane passing through the center point of the node. For a node, a G-PCC encoder may encode a syntax element for each of an x, y, and z dimension to specify whether the dimension is coded with the planar mode, and for each dimension that is coded with the planar mode, a plane position syntax element (i.e., a syntax element indicating a plane position) may be signaled for the respective dimension. The plane position syntax element for a dimension indicates whether the plane orthogonal to the dimension is at a first position or a second position. If the plane is at the first position, the plane corresponds to a boundary of the node. If the plane is at the second position, the plane passes through a 3D center of the node. More generally, if the plane is at the first position, the points in the node are on that side of the node that is the first position and not on the side of the second position, and if the plane is at the second position, the points in the node are on that side of the node that is the second position and not on the side of the position. Thus, for the z-dimension, a G-PCC coder may code a vertical plane position of a planar mode in a node of an octree that represents 3-dimensional positions of points of the point cloud.

Point clouds can often be captured using a LIDAR sensor or other laser-based sensor. The angular coding mode is optionally used together with the planar mode and improves the coding of the vertical (e.g., z) plane position syntax element by employing knowledge of positions and elevation angles of sensing laser beams in a typical LIDAR sensor. Furthermore, the angular coding mode can optionally be used to improve the coding of vertical z-position bits in inferred direct coding mode (IDCM).

G-PCC coders may also support in-tree quantization. In-tree geometry scaling provides a means to quantize (encoder) and scale (decoder) geometry positions even while the coding tree is being constructed. Each point in the point cloud is located at a particular geometric position. In octree coding, the information about the position may not be signaled directly, but rather, the octree occupancy across the hierarchies (from root node to leaf node) may be used to indicate the geometry position of the point. At the encoder, the points, or rather the occupied positions of the points, are placed in the leaf nodes of the octree. The size of the octree depends on the bit depth of the positions in each dimension. Starting with the root node, the occupancy of each of the eight octants is coded (in different ways). Occupancy at the root node effectively codes the most significant bits (MSBs) of the point positions in the three dimensions. This process continues until the leaf node which indicate the positions of the points. The decoder follows a similar process determining the occupancy of the octree nodes at each level, up until the leaf nodes, to determine the positions of the points.

The geometry quantization is applied at a particular node depth in the octree which is signaled in the bitstream. Node depth generally refers to a particular level in the octree parsing. In the simple case where only the octree is considered (without QTBT), suppose that the octree has 12 levels. At the root node, each child node has a size of $2^{11} \times 2^{11} \times 2^{11}$. Each of these nodes may be considered to be at node depth 1. The children of each of the child node of the root node would have the size of $2^{10} \times 2^{10} \times 2^{10}$, and these are considered nodes at node depth 2, and so on. In a simple example, if a node coordinate is 12 bits and the depth at which quantization is to be applied is 3, then the first 3 MSBs of the node coordinate (referred to as MSB portion of the position) are not quantized; only the last 9 LSBs of the node coordinate (referred to as LSB portion of the position) are quantized. Due to quantization, the 9 LSBs may be reduced to a fewer number of bits, such as N bit where N is less than or equal to 9. This may results in some reduction in bitrate at the expense of reconstruction precision. The results node coordinate size becomes N+3 (which is ≤12). Similarly at the decoder, the N LSBs are scaled and clipped to maximum values of 1<<(9−1), which ensures that the scaled values do not exceed the 9 LSBs bits of the original point. The final scaled position is calculated by joining the 3 MSBs and the 9 bits of the scaled LSBs.

In regular coding of a point cloud frame, angular mode provides considerable gain to coding efficiency. However, when in-tree quantization is enabled, the gain of the angular mode reduces considerably, and in some cases also produces a loss. For the angular mode (IDCM angular and planar angular), the quantized bits are used for context derivation, and the quantized bits are in a different scale space and are not in the same domain as the original points. This reduces the usefulness of both angular mode and in-tree quantization, and thus, may not be beneficial to enable both at the same time.

This disclosure describes technique for, when angular mode and in-tree quantization are used together, deriving a scaled value xS from a point/position coordinate value x to derive a position of the node/point with respect to a lidar origin. More specifically, by scaling a quantized value representing the coordinate value without clipping, a G-PCC decoder may determine a scaled value representing the coordinate position relative to the origin position in a manner that puts the scaled value into the same scale space as the original point value with enough accuracy to achieve coding gains from angular mode.

This disclosure uses the term G-PCC coder to refer generically to G-PCC encoder and/or G-PCC decoder. Moreover, certain techniques described in this disclosure with respect to decoding may also apply to encoding, and vice versa. For example, often times G-PCC encoders and G-PCC decoders are configured to perform the same process, or reciprocal processes. Also, a G-PCC encoder typically performs decoding as part of the processes of determining how to encode.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to angular modes and in-tree quantization in G-PCC.

Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to angular modes and in-tree quantization in G-PCC. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a web site), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, a geometry point cloud compression (G-PCC) standard. Although encoder 200 and decoder 300 are described as G-PCC encoder 200 and G-PCC decoder 300, encoder 200 and decoder 300 should not be considered as limited to operating according to the G-PCC standard. In some examples, encoder 200 and decoder 300 may operate according to the video point cloud compression (V-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As described above, ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC 1/SC 29/WG 11 w19088, Brussels, Belgium, January 2020, and a description of the codec is available in G-PCC Codec Description v6, ISO/IEC JTC 1/SC 29/WG 11 w19091, Brussels, Belgium, January 2020.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
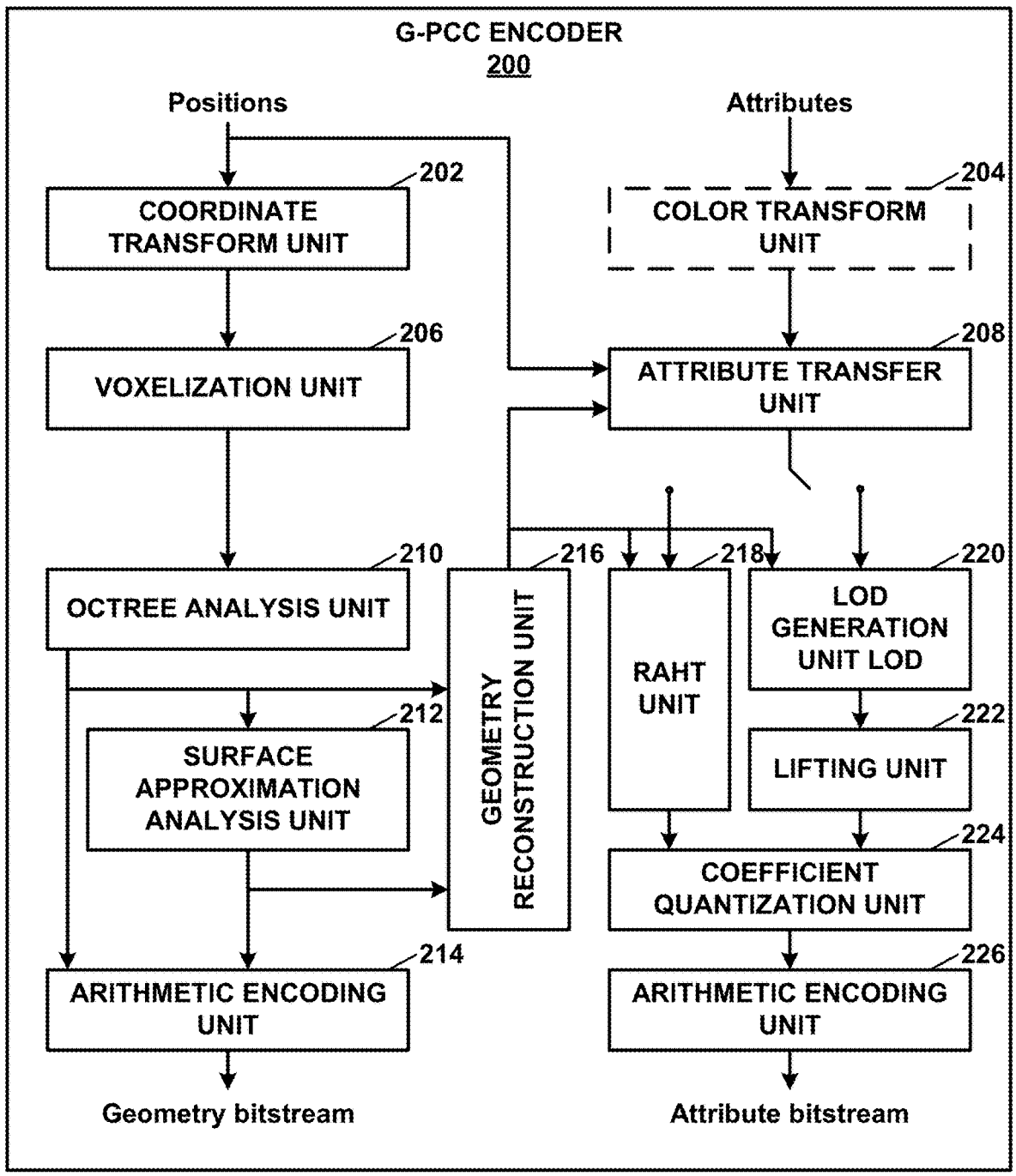
FIG. 2 is a block diagram illustrating an example Geometry Point Cloud Compression (G-PCC) encoder.
Figure 3:
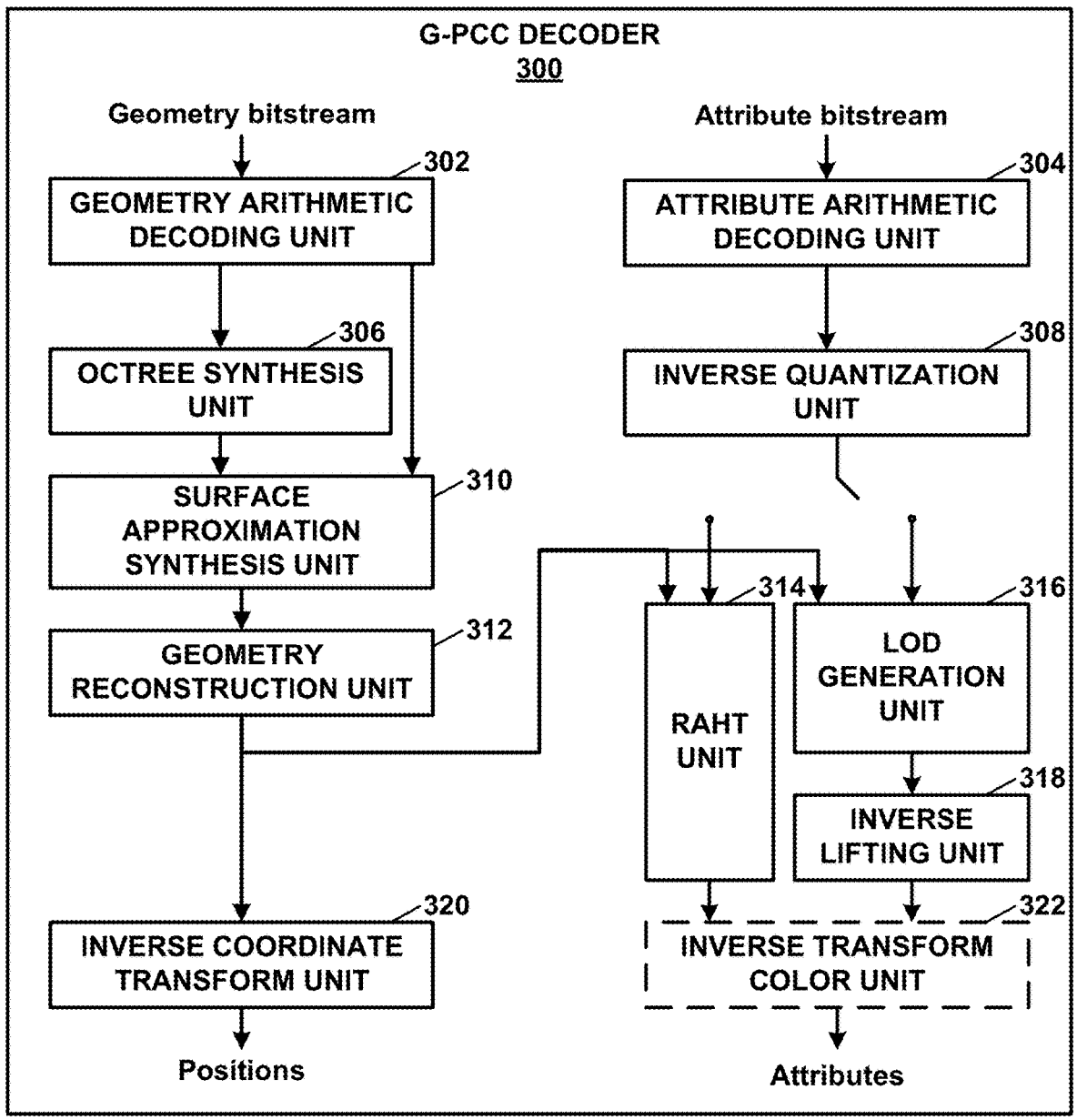
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC 13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, surface approximation analysis units 212, surface approximation synthesis unit 310, and RAHT units 218 and 314 represent options typically used for Category 1 data, while LOD generation units 220 and 316, lifting unit 222, and inverse lifting unit 318 represent options typically used for Category 3 data. All the other units may be common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbor prediction (Predicting Transform), and interpolation-based hierarchical nearest-neighbor prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding methods for the attributes are quantized. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may receive a set of positions and a set of attributes. The positions may include coordinates of points in a point cloud. The attributes may include information about points in the point cloud, such as colors associated with points in the point cloud.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in a geometry bitstream.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. Alternatively or additionally, LOD generation unit 220 and lifting unit 222 may apply LOD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in an attribute bitstream.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322.

G-PCC decoder 300 may obtain a geometry bitstream and an attribute bitstream. Geometry arithmetic decoding unit 302 of G-PCC decoder 300 may apply arithmetic decoding (e.g., Context-Adaptive Binary Arithmetic Coding (CABAC) or other type of arithmetic decoding) to syntax elements in the geometry bitstream. Similarly, attribute arithmetic decoding unit 304 may apply arithmetic decoding to syntax elements in the attribute bitstream.

Octree synthesis unit 306 may synthesize an octree based on syntax elements parsed from the geometry bitstream. In instances where surface approximation is used in the geometry bitstream, surface approximation synthesis unit 310 may determine a surface model based on syntax elements parsed from the geometry bitstream and based on the octree.

Furthermore, geometry reconstruction unit 312 may perform a reconstruction to determine coordinates of points in a point cloud. Inverse transform coordinate unit 320 may apply an inverse transform to the reconstructed coordinates to convert the reconstructed coordinates (positions) of the points in the point cloud from a transform domain back into an initial domain.

Additionally, in the example of FIG. 3, inverse quantization unit 308 may inverse quantize attribute values. The attribute values may be based on syntax elements obtained from the attribute bitstream (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. Alternatively, LOD generation unit 316 and inverse lifting unit 318 may determine color values for points of the point cloud using a level of detail-based technique.

Furthermore, in the example of FIG. 3, inverse transform color unit 322 may apply an inverse color transform to the color values. The inverse color transform may be an inverse of a color transform applied by color transform unit 204 of G-PCC encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by G-PCC encoder 200 and G-PCC decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits. G-PCC encoder 200 and G-PCC decoder 300 may be configured to code point cloud data using planar, angular, and azimuthal coding modes. The planar coding mode was adopted at the $128^{th}$ MPEG meeting in Geneva, Switzerland. The planar coding mode may be applied to each of the three dimensions x, y and z at each node position. When planar coding mode is specified for a particular dimension (e.g., z) at a node point, the planar coding mode indicates that all the children of the node occupy only one of the z half-planes, as described below with respect to FIG. 4. Similar illustrations (e.g., techniques) apply to the planar mode in the x and y dimensions.

The angular coding mode was adopted at the 129th MPEG meeting in Brussels, Belgium. The following description is based on the original MPEG contributions documents: Sebastien Lasserre, Jonathan Taquet, "[GPCC] [CE 13.22 related] An improvement of the planar coding mode," ISO/IEC JTC 1/SC 29/WG 11 MPEG/m50642, Geneva, CH, October 2019; and w19088. The angular coding mode is optionally used together with planar mode (e.g., as described in Sebastien Lasserre, David Flynn, "[GPCC] Planar mode in octree-based geometry coding," ISO/IEC JTC 1/SC 29/WG 11 MPEG/m48906, Gothenburg, Sweden, July 2019) and improves the coding of the vertical (z) plane position syntax element by employing knowledge of positions and angles of sensing laser beams in a typical LIDAR sensor (see e.g., Sebastien Lasserre, Jonathan Taquet, "[GPCC] CE 13.22 report on angular mode," ISO/IEC JTC 1/SC 29/WG 11 MPEG/m51594, Brussels, Belgium, January 2020).

The azimuthal coding mode was adopted at the $130^{th}$ MPEG teleconference meeting. The azimuthal coding mode is similar to the angular mode and extends the angular mode to the coding of the (x) and (y) plane position syntax elements of the planar mode and improves the coding of the x- or y-position bits in IDCM. The azimuthal mode uses the sampling information of the azimuth of each laser (e.g., number of points a laser may acquire in one rotation). In this disclosure, the term "angular mode" may also refer to azimuthal modes as described below.

Figure 4:
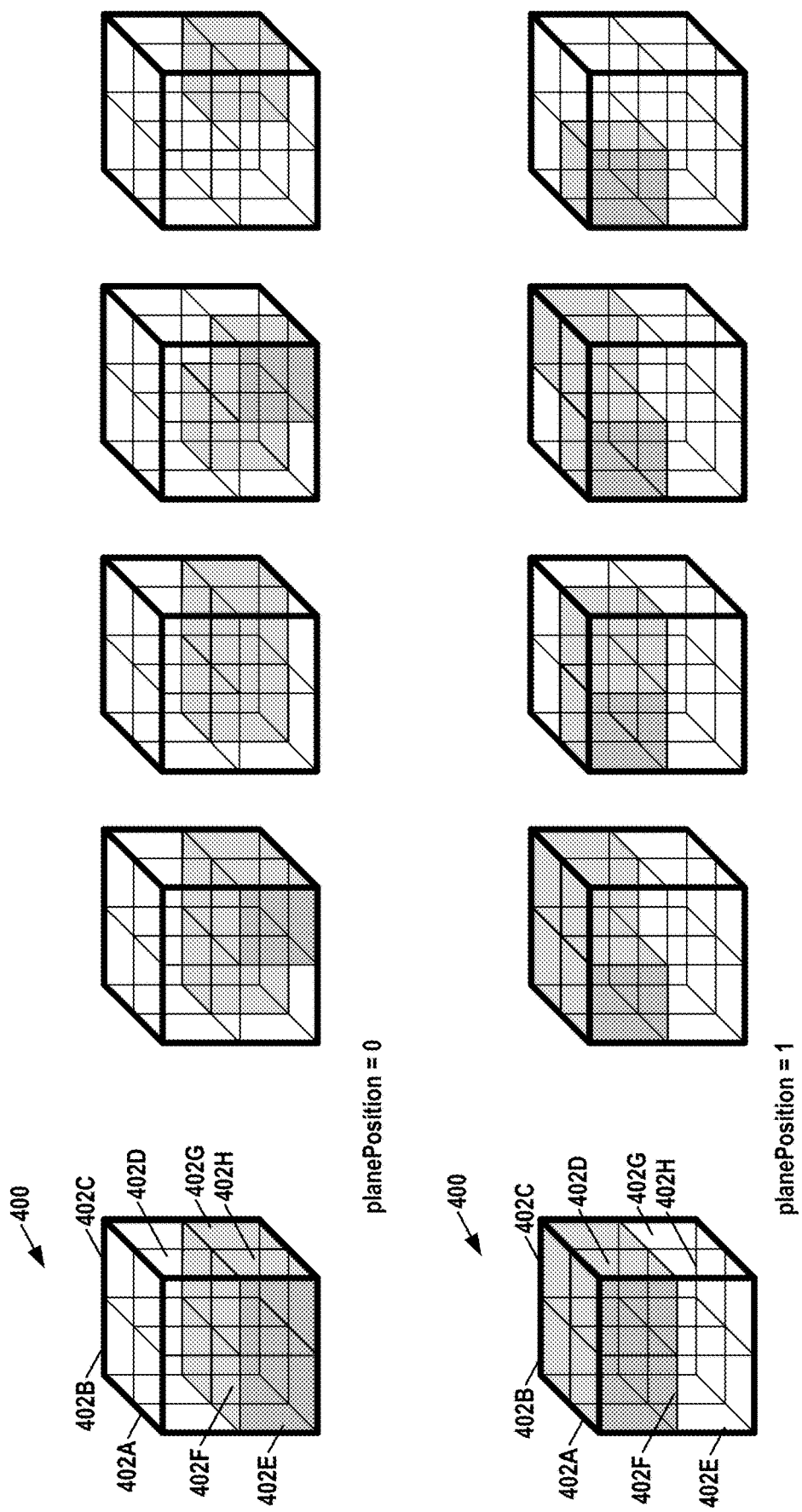
FIG. 4 is a conceptual diagram illustrating example planar occupancy in a vertical direction.

FIG. 4 is a conceptual diagram illustrating example planar occupancy in a vertical direction. In the example of FIG. 4, a node 400 is partitioned into eight child nodes. Child nodes 402A-402H may be occupied or unoccupied. In the example of FIG. 4, occupied child nodes are shaded. When one or more child nodes 402A-402D are occupied and none of child nodes 402E-402H are occupied, G-PCC encoder 200 may signal a plane position syntax element with a value of 0 to indicate that all occupied child nodes are adjacent on a positive side (i.e., a side of increasing z-coordinates) of a plane of the minimum z coordinate of node 400. When one or more child nodes 402E-402H are occupied and none of child nodes 402A-402D are occupied, G-PCC encoder 200 may signal a plane position syntax element with a value of 1 to indicate that all occupied child nodes are adjacent on a positive side of a plane of a midpoint z coordinate of node 400. In this way, the plane position syntax element may indicate a vertical plane position of a planar mode in node 400.

The angular coding mode may also optionally be used to improve the coding of vertical z-position bits in IDCM, (Sébastien Lasserre, Jonathan Taquet, "[GPCC] CE 13.22 report on angular mode," ISO/IEC JTC 1/SC 29/WG 11 MPEG/m51594, Brussels, Belgium, January 2020). IDCM is a mode in which the positions of points within a node are explicitly (e.g., directly) signaled relative to a point within a node. In the angular coding mode, the positions of points may be signaled relative to an origin point of the node and the relationship of the captured points, for example using laser characteristics, are used to compress the positions effectively.

The angular coding mode may also be used when the point cloud is generated based on data generated by a range-finding system, such as a LIDAR system. The LIDAR system may include a set of lasers arrayed in a vertical plane at different angles relative to an origin point. The LIDAR system may rotate around a vertical axis. The LIDAR system may use returned laser light to determine the distances and positions of points in the point cloud. The laser beams emitted by the lasers of a LIDAR system may be characterized by a set of parameters.

In the following descriptions, a laser, laser beam, laser sensor or sensor, or other similar terms may represent any sensor that can return a distance measure and a spatial orientation, including potentially an indication of time, for example, a typical LIDAR sensor.

G-PCC encoder 200 or G-PCC decoder 300 may code (e.g., encode or decode, respectively) the planar mode's vertical plane position in a node by selecting a laser index out of a set of laser candidates that are signaled in a parameter set, such as the geometry parameter set, with the selected laser index indicating the laser beam that intersects the node or that is closest to the center of the node. The intersection, or nearness, of the laser beam with the node determines the context index (e.g., contextAngle, contextAnglePhiX, or contextAnglePhiY, below) used to arithmetically code the planar mode's vertical plane position.

Thus, in some examples, a G-PCC coder (e.g., G-PCC encoder 200 or G-PCC decoder 300) may code a vertical plane position of a planar mode in a node of an octree that represents 3-dimensional positions of points in the point cloud. For ease of explanation, this disclosure may refer to a node that the G-PCC coder is coding as a current node. As part of coding the vertical plane position of the planar mode, the G-PCC coder may determine a laser index of a laser candidate in a set of laser candidates. The determined laser index indicates a laser beam that is closest to or intersects the current node. The set of laser candidates may include each of the lasers in a LIDAR array. In some examples, the set of laser candidates may be indicated in a parameter set, such as a geometry parameter set. Additionally, as part of coding the vertical plane position, the G-PCC coder determines a context index based on an intersection, or nearness, of the laser beam with the current node. For instance, the G-PCC coder may determine a context index based on whether the laser beam is above a first distance threshold, between the first distance threshold and a second distance threshold, between the second distance threshold and a third distance threshold, or below the third distance threshold. Furthermore, as part of coding the vertical plane position, the G-PCC coder arithmetically codes the vertical plane position of the planar mode using a context indicated by the determined context index.

There may be an eligibility condition to determine whether the planar mode's vertical plane position in the current node is eligible to be coded using the angular mode. If the vertical plane position is not eligible to be coded using the angular mode, the planar mode's vertical plane position may be coded without employing sensor information. In some examples, the eligibility condition may determine whether only one laser beam intersects the current node. In other words, the vertical plane position of the current node may be eligible to be coded using the angular mode if only one laser beam (i.e. not two or more laser beams) intersects the current node. In some examples, the eligibility condition may determine the minimum angle difference between the lasers out of the set of laser candidates. In other words, the current node may be eligible to be coded using the angular mode if the angle enveloping the current node is less than the minimum angle between laser beams. The angle enveloping the current node is an angle measured from the laser origin between a line passing through a far, bottom corner of the node and a line passing through a near, top corner of the node. When the angle enveloping the current node is less than the minimum angle difference between laser beams, at most one laser beam intersects the node. In some examples, the eligibility condition is such that the vertical node dimension is smaller than (or equal to) the minimum angle difference. In other words, the current node may be eligible to be coded using the angular mode if the vertical dimension of the node is less than or equal to a vertical distance between laser beams separated by the minimum angle difference at the closest vertical edge of the current node to the laser origin.

As noted above, the G-PCC coder may select a laser index of a laser beam that intersects, or is nearest to, the current node. In some examples, the G-PCC coder may determine the index of the laser that intersects, or is nearest to, the current node by selecting a laser beam that is nearest to a marker point in the current node. In some examples, the marker point in the current node may be the center point of the current node with coordinates at half of all three dimensions of the current node (for example, cube or cuboid dimensions). In other examples, the marker point in the current node may be any other point that is part of the current node, such as any point within the node or on the node sides, or on the node edges, or node corners.

The G-PCC coder may determine whether a laser is near the marker point based on comparing angular differences of the candidate lasers. For example, the G-PCC coder may compare differences between angles of the laser beams and an angle of the marker point. The angles of the laser beams may be defined as being between the horizontal plane (z=0) and the direction of the laser beam. The angle of the marker point may be defined as being between the horizontal plane and the direction of a virtual beam to the marker point. The origin in this case may be collocated with the center of the sensor or laser. Alternatively, in some examples, mathematical functions or trigonometric functions such as the tangent may be applied to the angles before the comparison.

In some examples, the G-PCC coder may determine whether a laser is near the marker point based on a comparison of vertical coordinate differences. For example, the G-PCC coder may compare the marker point's vertical coordinate with respect to the sensor origin (e.g., the z-coordinate of the marker point) and the vertical coordinate of the laser intersection with, or nearness to, the node. The G-PCC coder may obtain the vertical coordinate of the laser intersection with the node by multiplying the tangent of the angle between the horizontal plane and the laser direction with a distance computed by taking a Euclidean distance based on the (x,y) coordinates of the marker point (trigonometry).

In some examples, the G-PCC coder may determine a context index to use to code a vertical plane position syntax element based on a relative position of the laser beam and the marker point. For example, the G-PCC coder may determine that a context index is a first context index if the laser beam is above the marker point and may determine that the context index is a second context index if the laser beam is below the marker point. The G-PCC coder may determine whether the laser beam is above or below the marker point in a similar fashion as determining a laser beam index that intersects with, or is nearest to, the node, e.g., by comparing angular differences, comparing differences of tangent of angle values, or comparing vertical coordinate differences.

In some examples, as part of determining the context index, the G-PCC coder may determine distance threshold values. The G-PCC coder may use the distance threshold values to compare the distance between the laser beam and the marker point. The distance threshold values may divide a distance range within the current node into intervals. The intervals may be of equal or unequal lengths. Each interval of the intervals may correspond to a context index if the laser beam is within the distance range determined by the distance intervals. In some examples, there are two distance thresholds determined by equal distance offsets above and below the marker point, which define three distance intervals that correspond with three context indexes. The G-PCC coder may determine whether the laser beam belongs to an interval in a similar fashion as determining the laser beam index of a laser that intersects with, or is nearest to, the node (e.g., by comparing angular differences, comparing differences of tangent of angle values, or comparing vertical coordinate differences).

The above principles, which employ sensor information, are not limited to coding the planar mode's vertical (Z) plane position syntax element within a node, but similar principles may also be applied to coding the planar mode's X or Y plane position syntax elements within a node. The planar mode's X or Y plane position modes may be chosen by an encoder if they are more appropriate to code the point distribution within the node. For instance, if occupied child nodes are all on one side of a plane oriented in the X direction, an X plane position syntax element may be used to code the point distribution within the node. If occupied child nodes are all on one side of a plane oriented in the Y direction, a Y plane position syntax element may be used to code the point distribution within the node. Additionally, combinations of two or more planes oriented in the X, Y, or Z directions may be used to indicate occupancy of child nodes.

Figure 5:
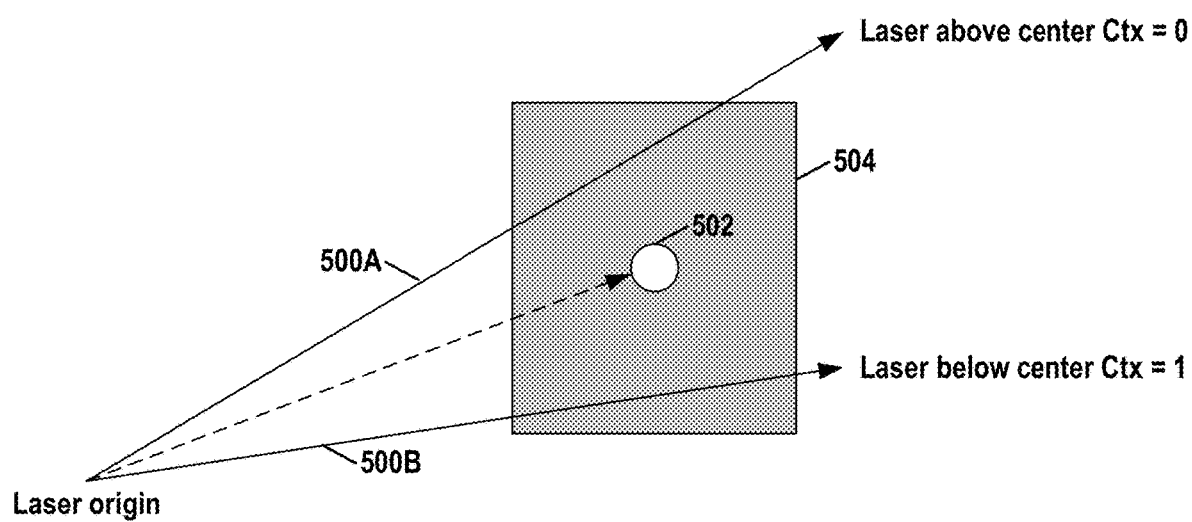
FIG. 5 is a conceptual diagram of an example in which a context index is determined based on laser beam positions above or below a marker point of a node, in accordance with one or more techniques of this disclosure.

The G-PCC coder may, as one example, determine a context from among two contexts based on whether the laser beam is above or below the marker point (i.e., is positioned above or below the marker point). In this example, the marker point is the center of the node. This is illustrated in FIG. 5. More specifically, FIG. 5 is a conceptual diagram of an example in which a context index is determined based on laser beam positions 500A, 500B above or below a marker point 502 of a node 504. Thus, in the example of FIG. 5, if the laser that intersects node 504 is above marker point 502, as shown with respect to laser beam position 500A, the G-PCC coder selects a first context index (e.g., Ctx=0). In the example of FIG. 5, marker point 502 is located at a center of node 504. If the laser that intersects node 504 is below marker point 502, as shown with respect to laser beam position 500B, the G-PCC coder selects a second context index (e.g., Ctx=1).

Figure 6:
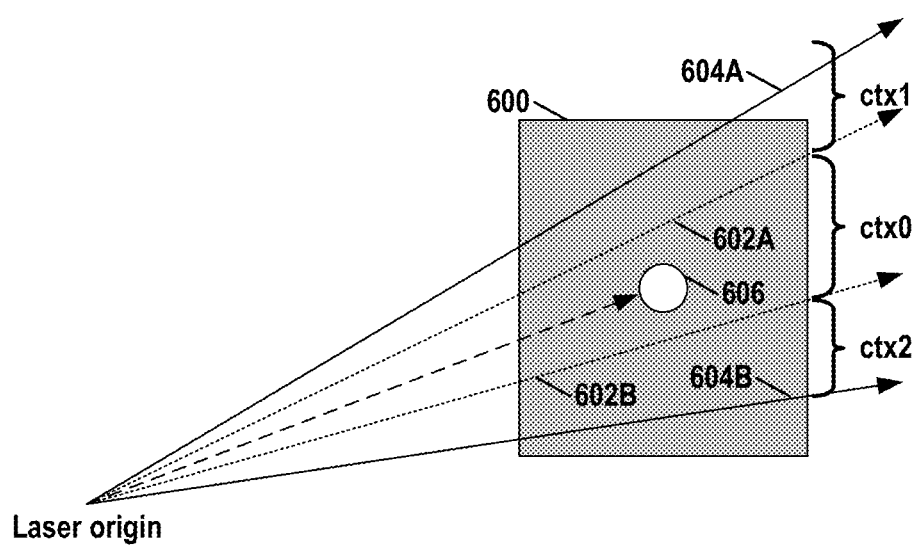
FIG. 6 is a conceptual diagram illustrating an example three-context index determination.

In some examples, the G-PCC coder determines three contexts based on the laser beam being positioned above or below two distance thresholds, or in between the distance thresholds. In this example, the marker point is the center of the node. This is illustrated in FIG. 6. More specifically, FIG. 6 is a conceptual diagram illustrating an example three-context index determination for a node 600. In FIG. 6, the distance interval thresholds are indicated with fine-dotted lines 602A, 602B. Laser beams are indicated with solid lines 604A, 604B. Each of these laser beams may be a laser candidate. A center point 606 (marker point) is indicated with a white circle. Thus, in the example of FIG. 6, if a laser (such as the laser corresponding to line 604A) is above line 602A, the G-PCC coder selects the context index ctx1. If a laser is between lines 602A, 602B, the G-PCC coder may select the context index ctx0. If a laser (such as the laser corresponding to line 604B) is below line 602B, the G-PCC coder may select the context index ctx2.

Figure 7:
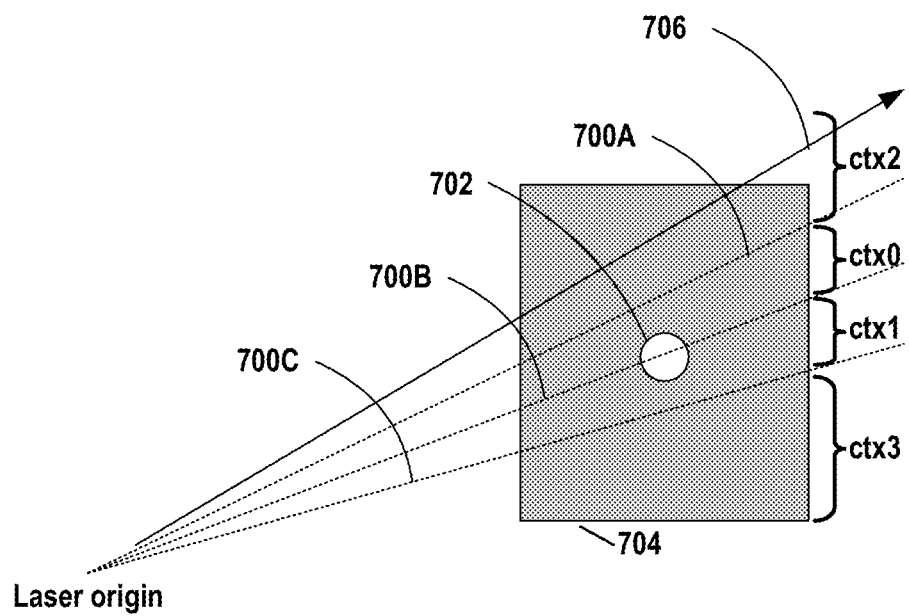
FIG. 7 is a conceptual diagram illustrating an example context index determination for coding a planar mode's vertical plane position based on a laser beam position with intervals separated by finely dotted lines.

In some examples, the G-PCC coder uses four contexts for coding the planar mode's vertical plane position in the case that the angular mode is used. In such examples, the G-PCC coder may determine the context index based on a laser beam's position within four intervals. This example is illustrated in FIG. 7. FIG. 7 is a conceptual diagram illustrating an example context index determination for coding a planar mode's vertical plane position (angular mode) based on a laser beam position (solid arrow) with intervals separated by finely dotted lines. In the example of FIG. 7, lines 700A, 700B, and 700C correspond to distance interval thresholds. Furthermore, in the example of FIG. 7, a marker point 702 is located at a center of node 704. Line 706 corresponds to a laser beam that intersects node 704. Because line 706 is above line 700A, the G-PCC coder may select a context index, ctx2, for use in coding the vertical plane position.

FIG. 8A is a flowchart illustrating an example operation for encoding a vertical plane position. G-PCC encoder 200 may perform the operation of FIG. 8A as part of encoding a point cloud.

In the example of FIG. 8A, G-PCC encoder 200 (e.g., arithmetic encoding unit 214 of G-PCC encoder 200 (FIG. 2) may encode a vertical plane position of a planar mode in a node of a tree (e.g., an octree) that represents 3-dimensional positions of points in a point cloud represented by point cloud data (800). In other words, G-PCC encoder 200 may encode the vertical plane position.

As part of encoding the vertical plane position of the planar mode, G-PCC encoder 200 (e.g., arithmetic encoding unit 214) may determine a laser index of a laser candidate in a set of laser candidates, wherein the determined laser index indicates a laser beam that intersects the node (802). G-PCC encoder 200 may determine the laser index in accordance with any of the examples provided elsewhere in this disclosure.

Additionally, G-PCC encoder 200 (e.g., arithmetic encoding unit 214) may determine a context index based on whether the laser beam is above a first distance threshold, between the first distance threshold and a second distance threshold, between the second distance threshold and a third distance threshold, or below the third distance threshold (804). For instance, in the example of FIG. 7, G-PCC encoder 200 may determine the context index based on whether the laser beam is above a first distance threshold (corresponding to line 700A), between the first distance threshold and a second distance threshold (corresponding to line 700B), between the second distance threshold and a third distance threshold (corresponding to line 700C), or below the third distance threshold. In some examples, to determine the position of the laser beam relative to the first, second, and third distance thresholds, G-PCC encoder 200 may determine a laser difference angle (e.g., thetaLaserDelta below) by subtracting a tangent of the angle of the line passing through the center of the node from a tangent of an angle of the laser beam, determine a top angle difference (e.g., DeltaTop below) by subtracting a shift value from the laser difference angle; and determine a bottom angle difference (e.g., DeltaBot below) by adding the shift value to the laser difference angle.

G-PCC encoder 200 may perform a first comparison that determines whether the laser difference angle is greater than or equal to 0 (e.g., thetaLaserDelta>=0). G-PCC encoder 200 may set the context index to 0 or 1 based on whether the laser difference angle is greater than or equal to 0 (e.g., contextAngular[Child]=thetaLaserDelta>=0?0:1. Additionally, G-PCC encoder 200 may perform a second comparison (e.g., DeltaTop>=0) that determines whether the top angle difference is greater than or equal to 0. The laser beam is above the first distance threshold when the top angle difference is greater than or equal to 0. G-PCC encoder 200 may also perform a third comparison (e.g., DeltaBottom<0) that determines whether the bottom angle difference is less than 0. The laser beam is below the third distance threshold when the bottom angle difference is less than 0. G-PCC encoder 200 may increment the context index by 2 based on the top angle difference being greater than or equal to 0 (e.g., if (DeltaTop>=0) contextAngular[Child]+=2) or based on the bottom angle difference being less than 0 (e.g., else if (DeltaBottom<0) contextAngular[Child]+=2).

G-PCC encoder 200 (e.g., arithmetic encoding unit 214 of G-PCC encoder 200) may arithmetically encode the vertical plane position of the planar mode using a context indicated by the determined context index (806). For example, G-PCC encoder 200 may perform CABAC encoding on a syntax element indicating the vertical plane position.

FIG. 8B is a flowchart illustrating an example operation for decoding a vertical plane position. G-PCC decoder 300 may perform the operation of FIG. 8B as part of reconstructing a point cloud represented by point cloud data. In the example of FIG. 8B, G-PCC decoder 300 (e.g., geometry arithmetic decoding unit 302 of FIG. 3) may decode a vertical plane position of a planar mode in a node of a tree (e.g., an octree) that represents 3-dimensional positions of points in the point cloud (850). In other words, G-PCC decoder 300 may decode the vertical plane position.

As part of decoding the vertical plane position of the planar mode, G-PCC decoder 300 (e.g., geometry arithmetic decoding unit 302) may determine a laser index of a laser candidate in a set of laser candidates, wherein the determined laser index indicates a laser beam that intersects or is closest to the node (852). G-PCC decoder 300 may determine the laser index in accordance with any of the examples provided elsewhere in this disclosure.

Additionally, G-PCC decoder 300 may determine a context index (contextAngular) based on whether the laser beam is above a first distance threshold, between the first distance threshold and a second distance threshold, between the second distance threshold and a third distance threshold, or below the third distance threshold (854). G-PCC decoder 300 may determine the context index in the same manner as G-PCC encoder 200, as described above.

G-PCC decoder 300 (e.g., geometry arithmetic decoding unit 302 of G-PCC decoder 300) may arithmetically decode the vertical plane position of the planar mode using a context indicated by the determined context index (856). For example, G-PCC decoder 300 may perform CABAC decoding on a syntax element indicating the vertical plane position. In some examples, G-PCC decoder 300 may determine positions of one or more points in the point cloud based on the vertical plane position. For instance, G-PCC decoder 300 may determine, based on the vertical plane position, locations of occupied child nodes of a node. G-PCC decoder 300 may then process the occupied child nodes to determine positions of points within the occupied child nodes and may not need to perform further processing on the unoccupied child nodes.

A G-PCC coder (e.g., G-PCC encoder 200 or G-PCC decoder 300) may code (i.e., encode or decode) a IDCM's vertical point position offset within a node in part by selecting a laser index out of a set of laser candidates. The set of laser candidates may be signaled in a parameter set, such as the geometry parameter set, with the selected laser index indicating the laser beam that intersects the node. The set of laser candidates may correspond to lasers in a LIDAR array. The G-PCC coder may determine the context indexes to arithmetically code the bins (bits) from the IDCM's vertical point position offset based on the intersection of a laser beam with a node.

As introduced above, G-PCC encoder 200 and G-PCC decoder 300 may be configured to perform context derivation for angular modes. The planar mode context derivation for the three coordinates x, y and z is described below. As the LIDAR lasers are rotating in the xy plane, the treatment of the x and y coordinates may be similar to one another and different than the treatment of the z coordinate. In other examples, two different planes may be similar with the third different.

For determining the position of the node and the midpoint of the node, G-PCC encoder 200 and G-PCC decoder 300 may derive variables absPos and midNode as set forth below, with child.pos and childSizeLog2 referring, respectively, to the position and size of the current node.

```
{
    Vec3<int64_t> absPos = {child.pos[0] << childSizeLog2[0],
        child.pos[1] << childSizeLog2[1],
        child.pos[2] << childSizeLog2[2]};
    // eligibility
    Vec3<int64_t> midNode = {1 << (childSizeLog2[0] ? childSizeLog2[0] - 1 : 0),
        1 << (childSizeLog2[1] ? childSizeLog2[1] - 1 : 0),
        1 << (childSizeLog2[2] ? childSizeLog2[2] - 1 : 0)};
```

When the node size is too large (that is when more than one laser may pass through a node), G-PCC encoder 200, and hence G-PCC decoder 300, disables angular mode. G-PCC encoder 200 computes an estimate (deltaAngle) of the smallest distance between two adjacent lasers at the distance of the middle of the node and compares the estimate with the node size. When the current node is larger than a threshold, G-PCC encoder 200 disables angular mode. The variable headPos refers to the position of the LIDAR head, which can be used to find the coordinates xLidar/yLidar/zLidar with respect to the LIDAR origin, as follows:

```
uint64_t xLidar =
    std::abs(((absPos[0] - headPos[0] + midNode[0]) << 8) - 128);
uint64_t yLidar =
    std::abs(((absPos[1] - headPos[1] + midNode[1]) << 8) - 128);
uint64_t rL1 = (xLidar + yLidar) >> 1;
uint64_t deltaAngleR = deltaAngle * rL1;
if (deltaAngleR <= (midNode[2] << 26))
    return -1;
```

In the next step, G-PCC encoder 200 computes the angular elevation theta32 of the middle of the node in the z-direction (zLidar) and estimates the index of the laser that is closest to the node center, laserIndex, as follows:

```
// determine inverse of r (1/sqrt(r2) = irsqrt(r2))
    uint64_t r2 = xLidar * xLidar + yLidar * yLidar;
    uint64_t rInv = irsqrt(r2);
    // determine non-corrected theta
    int64_t zLidar = ((absPos[2] - headPos[2] + midNode[2]) << 1) - 1;
    int64_t theta = zLidar * rInv;
    int theta32 = theta >=0 ? theta >> 15 : -((-theta) >> 15);
    // determine laser
    int laserIndex = int(child.laserIndex);
    if (laserIndex ? 255 || deltaAngleR <= (midNode[2] << (26 + 2))) {
        auto end = thetaLaser + numLasers - 1;
        auto it = std::upper_bound(thetaLaser + 1, end, theta32);
        if (theta32 - *std::prev(it) <= *it - theta32)
            --it;
        laserIndex = std::distance(thetaLaser, it);
        child.laserIndex = uint8_t(laserIndex);
    }
```

Once the nearest laser is estimated, G-PCC encoder 200 estimates the context for the planar mode of x and y coordinates. In some examples, G-PCC encoder 200 determines only a context for only one of x and y, and when one coordinate is coded with angular planar mode, the other coordinate is not planar coded. For each laser, the last coded/predicted azimuth is stored in phiBuffer. Based on the speed of the laser (input parameter), G-PCC encoder 200 updates the prediction of the azimuth, and determines the context by comparing the updated azimuth prediction, the azimuth of the node origin, and then checking which part of the current node the closest laser passes through, which may be used to estimate one of six contexts for the x/y dimensions, as follows:

```
// -- PHI --
//angles
int posx = absPos[0] - headPos[0];
int posy = absPos[1] - headPos[1];
int phiNode = iatan2(posy + midNode[1], posx + midNode[0]);
int phiNode0 = iatan2(posy, posx);
// find predictor
int predPhi = phiBuffer[laserIndex];
if (predPhi == 0x80000000)
    predPhi = phiNode;
// use predictor
if (predPhi != 0x80000000) {
    // elementary shift predictor
    int Nshift =
        ((predPhi - phiNode) * phiZi.invDelta(laserIndex) + 536870912) >> 30;
    predPhi -= phiZi.delta(laserIndex) * Nshift;
    // ctx azimutal x or y
    int angleL = phiNode0 - predPhi;
    int angleR = phiNode - predPhi;
    int contextAnglePhi =
        (angleL >= 0 && angleR >= 0) || (angleL <0 && angleR < 0) ? 2 : 0;
    angleL = std::abs(angleL);
    angleR = std::abs(angleR);
    if (angleL > angleR) {
        contextAnglePhi++;
        int temp = angleL;
        angleL = angleR;
        angleR = temp;
    }
    if (angleR > (angleL << 2))
        contextAnglePhi += 4;
    if (std::abs(posx) <= std::abs(posy))
        *contextAnglePhiX = contextAnglePhi;
    else
        *contextAnglePhiY = contextAnglePhi;
}
```

For the context of the z-dimension, three thresholds are chosen: theta32, theta32−zShift and theta32+ zShift. By comparing the elevation angle of the closest laser, thetaLaser [laserIndex] with the three thresholds, G-PCC encoder 200 derives one of four contexts for the planar mode of the z coordinate, as follows:

```
// -- THETA --
int thetaLaserDelta = thetaLaser[laserIndex] - theta32;
int64_t hr = zLaser[laserIndex] * rInv;
thetaLaserDelta += hr >= 0 ? -(hr >> 17) : ((-hr) >> 17);
int64_t zShift = (rInv << chiLdSizeLog2[2]) >> 20;
int thetaLaserDeltaBot = thetaLaserDelta + zShift;
int thetaLaserDeltaTop = thetaLaserDelta - zShift;
int contextAngle = thetaLaserDelta >= 0 ? 0 : 1;
if (thetaLaserDeltaTop >= 0)
    contextAngle += 2;
else if (thetaLaserDeltaBot < 0)
```

```
        contextAngle += 2;
    return contextAngle;
}
```

As introduce above, G-PCC encoder 200 and G-PCC decoder 300 may also be configured to determine IDCM mode contexts. IDCM refers to a mode in G-PCC where the position of points within a node are coded without using the octree structure within that node. IDCM may, for example, be beneficial for point clouds with sparse nodes or outliers, where coding the coordinates of the points in such cases may be cheaper than coding the points with the full octree structure. In G-PCC, only one or two distinct positions can be coded as IDCM nodes within a node.

When angular mode is used, G-PCC encoder 200 may context code, based on the laser parameters, the bits corresponding to the positions. Example ways in which the context for the bits coded in angular IDCM mode are derived is described below. The following description describes techniques that may be performed by G-PCC encoder 200 and/or G-PCC decoder 300.

G-PCC encoder 200 and G-PCC decoder 300 may be configured to determine nodePosition and laser index. As mentioned above, in IDCM up to two distinct positions in a node may be encoded. The first step may be to determine the number of points occupying the up to two positions, which may be done as follows:

```
int numPoints = 1;
bool numPointsGt1 = arithmeticDecoder->decode(_ctxNumIdcmPointsGt1);
numPoints += numPointsGt1;
int numDuplicatePoints = 0;
if (!geom_unique_points_flag && !numPointsGt1) {
    numDuplicatePoints = ! arithmeticDecoder-
>decode(_ctxSinglePointPerBlock);
    if (numDuplicatePoints) {
        bool singleDup = _arithmeticDecoder->decode(_ctxSingleIdcmDupPoint);
        if (!singleDup)
            numDuplicatePoints +=
                1 + _arithmeticDecoder->decodeExpGolomb(0,
_ctxPointCountPerBlock);
    }
}
```

For the next step, G-PCC encoder 200 and G-PCC decoder 300 may be configured to check whether the planar mode applies to the current node. If the planar mode applies, the MSBs of the corresponding coordinate may be signaled separately (planar), and effectively only the remaining bits are coded. The coding of the MSB using the planar mode may be performed before the IDCM coding. The node size is updated from effectiveNodeSizeLog2 to nodeSizeLog2Rem, as follows:

```
// update node size after planar and determine upper part of position from planar
    Vec3<int32_t> deltaPlanar{0, 0, 0};
    Vec3<int> nodeSizeLog2Rem = nodeSizeLog2;
    for (int k = 0; k < 3; k++)
        if (nodeSizeLog2Rem[k] > 0 && (planar.planarMode & (1 << k))) {
            deltaPlanar[k] |= (planar.planePosBits & (1 << k) ? 1 : 0);
            nodeSizeLog2Rem[k]--;
        }
```

For the next step, G-PCC encoder 200 and G-PCC decoder 300 calculate the position posNodeLidar of the node with respect to the LIDAR origin headpost, as shown below. The x and y positions are used to determine whether the x or the y coordinate of the positions in this node are to be context coded, while the other position is bypass coded.

```
Vec3<bool> directIdcm = !angularIdcm;
point_t posNodeLidar;
if (angularIdcm) {
    posNodeLidar =
        point_t(
            node.pos[0] << nodeSizeLog2[0], node.pos[1] << nodeSizeLog2[1],
            node.pos[2] << nodeSizeLog2[2])
        - headPos;
```

```
    bool codeXorY = std::abs(posNodeLidar[0]) <= std::abs(posNodeLidar[1]);
    directIdcm.x( ) = !codeXorY;
    directIdcm.y( ) = codeXorY;
}
```

When more than one point is coded, G-PCC encoder 200 and G-PCC decoder 300 orders the points which further reduces the number of bits needed to code the point positions. This is achieved by coding one or more MSBs of x or y or z positions; as a result the number of bits that are remaining to be coded (nodeSizeLog2Rem) may be further reduced.

```
// decode nonordred two points
Vec3<int32_t> deltaPos[2];
deltaPos[0] = deltaPlanar;
deltaPos[1] = deltaPlanar;
if (numPoints == 2 && joint_2pt_idcm_enabled_flag)
    decodeOrdered2ptPrefix(directIdcm, nodeSizeLog2Rem, deltaPos);
```

As some bits are already coded (due to planar and joint coding of points), G-PCC encoder 200 and G-PCC decoder 300 may calculate the mid-point of the updated node position and use this mid-point to determine the closest laser that passes through the mid-point of the node, as follows:

```
if (angularIdcm) {
    for (int idx = 0; idx < 3; ++idx) {
        int N = nodeSizeLog2[idx] - nodeSizeLog2Rem[idx];
        for (int mask = N ? 1 << (N - 1) : 0; mask; mask >>= 1) {
            if (deltaPos[0][idx] & mask)
                posNodeLidar[idx] += mask << nodeSizeLog2Rem[idx];
        }
        if (nodeSizeLog2Rem[idx])
            posNodeLidar[idx] += 1 << (nodeSizeLog2Rem[idx] - 1);
    }
    node.laserIndex = findLaser(posNodeLidar, thetaLaser, numLasers);
}
```

If angular mode is enabled, G-PCC encoder 200 and G-PCC decoder 300 may context code the bits of positions that are not already coded. For example, the bits of one of x and y may be context coded, and other may be bypass coded, while bits of z are context coded as described below. Otherwise, all remaining bits may be bypass coded.

```
Vec3<int32_t> pos;
for (int i = 0; i < numPoints; i++) {
    if (angularIdcm) {
        *(outputPoints++) = pos = decodePointPositionAngular(
            nodeSizeLog2, nodeSizeLog2Rem, node, planar, headPos, zLaser,
            thetaLaser, deltaPos[i]);
    } else
        *(outputPoints++) = pos =
            decodePointPosition(nodeSizeLog2Rem, deltaPos[i]);
}
```

G-PCC encoder 200 and G-PCC decoder 300 may be configured to determine the contexts for angular IDCM. Determining the context for the IDCM node positions based on the laser parameters will now be described.

G-PCC encoder 200 and G-PCC decoder 300 may calculate the node position posXyz with respect to the LIDAR head position headpost, which may again be used to determine which coordinate (x or y) is to be context coded. If posXyz[1]>posXyz[0] (i.e., the absolute y coordinate value is larger), then G-PCC encoder 200 and G-PCC decoder 300 may bypass code y coordinate bits and context code the x coordinate bits. Otherwise, (i.e., absolute y coordinate value is less than absolute x coordinate), G-PCC encoder 200 and G-PCC decoder 300 may bypass code the x coordinate bits and context code the y coordinate bits. As each bit is coded, the updated node posXyz is calculated.

```
{
    Vec3<int32_t> delta = deltaPlanar;
    Vec3<int> posXyz = {(child.pos[0] << nodeSizeLog2[0]) - headPos[0],
                        (child.pos[1] << nodeSizeLog2[1]) - headPos[1],
                        (child.pos[2] << nodeSizeLog2[2]) - headPos[2]};
    // -- PHI --
    // code x or y directly and compute phi of node
    bool codeXorY = std::abs(posXyz[0]) <= std::abs(posXyz[1]);
    if (codeXorY) { // direct code y
        if (nodeSizeLog2AfterPlanar[1])
            for (int i = nodeSizeLog2AfterPlanar[1]; i > 0; i--) {
                delta[1] <<= 1;
                delta[1] |= _arithmeticDecoder->decode( );
            }
        posXyz[1] += delta[1];
        posXyz[0] += delta[0] << nodeSizeLog2AfterPlanar[0];
    } else { //direct code x
        if (nodeSizeLog2AfterPlanar[0])
            for (int i = nodeSizeLog2AfterPlanar[0]; i > 0; i--) {
                delta[0] <<= 1;
                delta[0] |= _arithmeticDecoder->decode( );
            }
        posXyz[0] += delta[0];
        posXyz[1] += delta[1] << nodeSizeLog2AfterPlanar[1];
    }
}
```

In the next step, G-PCC encoder 200 and G-PCC decoder 300 calculate the laser index for the point using the laser index derived in the manner described above with respect to planar mode context and a laser index residual that is included in the bitstream.

```
// find predictor
    int phiNode = iatan2(posXyz[1], posXyz[0]);
    int laserNode = int(childlaserIndex);
    // laser residual
    int laserIndex = laserNode + decodeThetaRes( );
```

G-PCC encoder 200 and G-PCC decoder 300 use this updated laserIndex to determine a prediction for azimuth (phi) which is stored in a buffer_phiBuffer. As the laser is approximated to sample the points uniformly in the azimuth range, G-PCC encoder 200 and G-PCC decoder 300 may use the phiZi.delta to indicate the smallest difference in the azimuth value. Therefore, the number of points that may have been skipped from the predicted phi value is calculated as nShift, and the predicted phi value is updated.

```
int predPhi = _phiBuffer[laserIndex];
if (predPhi ? 0x80000000)
   predPhi = phiNode;
// elementary shift predictor
int nShift =
   ((predPhi - phiNode) * _phiZi.invDelta(laserIndex) + 536870912) >> 30;
predPhi -= _phiZi.delta(laserIndex) * nShift;
```

For the coordinate among x and y that is context coded, G-PCC decoder 300 decodes the remaining nodeSizeLog2AfterPlanar[0] bits (that are context coded). For each bit, G-PCC decoder 300 determines the updated context value by updating the node position by updating posXY as each bit is decoded. G-PCC decoder 300 also recomputes the predicted phi value when the node position is updated. One of six (or eight) contexts is chosen comparing the azimuth of the node position, azimuth of the position offset by half a node size in the direction which is context coded (i.e., x or y) and the predicted. Once the position is coded, the azimuth of the node phiNode is stored in the buffer.

```
// choose x or y
   int* posXY = codeXorY ? &posXyz[0] : &posXyz[1];
   int idx = codeXorY ? 0 : 1;
   // azimuthal code x or y
   int mask2 = codeXorY
      ? (nodeSizeLog2AfterPlanar[0] > 0 ? 1 << (nodeSizeLog2AfterPlanar[0] - 1)
            : 0)
      : (nodeSizeLog2AfterPlanar[1] > 0 ? 1 << (nodeSizeLog2AfterPlanar[1] - 1)
            : 0);
   for (; mask2; mask2 >>= 1) {
      // angles left and right
      int phiR = codeXorY ? iatan2(posXyz[1], posXyz[0] + mask2)
            : iatan2(posXyz[1] + mask2, posXyz[0]);
      int phiL = phiNode;
      // ctx azimutal
      int angleL = phiL - predPhi;
      int angleR = phiR - predPhi;
      int contextAnglePhi =
         (angleL >= 0 && angleR >= 0) || (angleL < 0 && angleR < 0) ? 2 : 0;
      angleL = std::abs(angleL);
      angleR = std::abs(angleR);
      if (angleL > angleR) {
         contextAnglePhi++;
         int temp = angleL;
         angleL = angleR;
         angleR = temp;
      }
      if (angleR > (angleL << 1))
         contextAnglePhi += 4;
      // entropy coding
      bool bit = arithmeticDecoder->decode(
         _ctxPlanarPlaneLastIndexAngularPhiIDCM[contextAnglePhi]);
      delta[idx] <<= 1;
      if (bit) {
         delta[idx] |= 1;
         *posXY += mask2;
         phiNode = phiR;
         predPhi = _phiBuffer[laserIndex];
         if (predPhi == 0x80000000)
            predPhi = phiNode;
         // elementary shift predictor
         int nShift =
            ((predPhi - phiNode) * _phiZi.invDelta(laserIndex) + 536870912) >> 30;
         predPhi -= _phiZi.delta(laserIndex) * nShift;
      }
   }
   // update buffer phi
   _phiBuffer[laserIndex] = phiNode;
```

Once the x and y positions are coded, the z coordinate is coded, similarly the derivation of context for the planar mode bit in z direction (explained above with respect to planar mode context) with the generalization for multiple bits as explained above. As each z-coordinate bit is coded, G-PCC decoder 300 recalculates the context for the next bit with the updated node position and z value that is offset from node position by half node size in the z-direction (posXyz [2]+maskz). Again, G-PCC decoder 300 chooses one of four contexts to code the z-coordinate bits.

```
// -- THETA --
  int maskz =
    nodeSizeLog2AfterPlanar[2] > 0 ? 1 << (nodeSizeLog2AfterPlanar[2] - 1) : 0;
  if (!maskz)
    return delta;
  int posz0 = posXyz[2];
  posXyz[2] += delta[2] << nodeSizeLog2AfterPlanar[2];
  // Since x and y are known,
  // r is known too and does not depend on the bit for z
  uint64_t xLidar = (int64_t(posXyz[0]) << 8) - 128;
  uint64_t yLidar = (int64_t(posXyz[1]) << 8) - 128;
  uint64_t r2 = xLidar * xLidar + yLidar * yLidar;
  int64_t rInv = irsqrt(r2);
  // code bits for z using angular. Eligibility is implicit. Laser is known.
  int64_t hr = zLaser[laserIndex] * rInv;
  int fixedThetaLaser =
    thetaLaser[laserIndex] + int(hr >= 0 ? -(hr >> 17) : ((-hr) >> 17));
  int zShift = (rInv << nodeSizeLog2AfterPlanar[2]) >> 18;
  for (int bitIdxZ = nodeSizeLog2AfterPlanar[2]; bitIdxZ > 0;
       bitIdxZ--, maskz >>= 1, zShift >>= 1) {
    // determine non-corrected theta
    int64_t zLidar = ((posXyz[2] + maskz) << 1) - 1;
    int64_t theta = zLidar * rInv;
    int theta32 = theta >= 0 ? theta >> 15 : -((-theta) >> 15);
    int thetaLaserDelta = fixedThetaLaser - theta32;
    int thetaLaserDeltaBot = thetaLaserDelta + zShift;
    int thetaLaserDeltaTop = thetaLaserDelta - zShift;
    int contextAngle = thetaLaserDelta >= 0 ? 0 : 1;
    if (thetaLaserDeltaTop >= 0)
      contextAngle += 2;
    else if (thetaLaserDeltaBot < 0)
      contextAngle += 2;
    delta[2] <<= 1;
    delta[2] |= _arithmeticDecoder->decode(
      _ctxPlanarPlaneLastIndexAngularIdcm[contextAngle]);
    posXyz[2] = posz0 + (delta[2] << (bitIdxZ - 1));
  }
  return delta;
}
```

G-PCC encoder 200 and G-PCC decoder 300 may be configured to use in-tree quantization. In-tree geometry scaling provides a means to quantize (e.g., at G-PCC encoder 200) and scale (e.g., at G-PCC decoder 300) geometry positions even while the coding tree is being constructed. In the current draft text, the quantization step size and the scaling of a position are applied as follows:
The shift value (sh) is calculated as:
  qpScaled=qp<<qpDivFactorLog2
  sh=qpScaled>>3
The scaling process is specified as follows:
  scaled_x=(x*(8+qpScaled % 8)<<sh+4)>>3

G-PCC encoder 200 and G-PCC decoder 300 apply the geometry quantization at a particular node depth in the octree (which is signaled in the bitstream). In a simple example, if a node coordinate is 12 bits, and the depth at which quantization is to be applied is 3, then the first 3 MSBs of the node coordinate, referred to as the MSB portion of the position, are not quantized. Only the last 9 LSBs of the node coordinate, referred to as LSB portion of the position, are quantized. Due to quantization, the 9 LSBs may be reduced to fewer number of bits, referred to herein as N, with N being less than 9. This quantization results in some reduction in bitrate at the expense of reconstruction precision. The resulting node coordinate size becomes N+3 (which is <=12).

Similarly, at G-PCC decoder 300, the N LSBs are scaled and clipped to a maximum value of 1<<(9−1), which ensures that the scaled values do not exceed the 9 LSBs bits of the original point. The final scaled position is calculated by joining the 3 MSBs and the 9 bits of the scaled LSBs.

In addition, a qp scale factor is also signalled which determines the minimum number of QPs that may be defined per doubling of step size. In G-PCC, this factor may take the values 0, 1, 2 and 3.

The number of QP points per doubling of step size for various values of qpDivFactorLog2 is specified in the table below:

| qpDivFactorLog2 | # QP points per doubling of step size |
| --- | --- |
| 0 | 8 |
| 1 | 4 |
| 2 | 2 |
| 3 | 1 |

For all the qpDivFactorLog2 values, the step size derivation is kept the same as scaling process as 8 QP points for doubling of step size, which is done by adjusting the QP value before calculation of the shift bits and the scaling process.

Existing techniques have some potential problems. For example, in regular coding of point cloud frame, angular mode provides considerable gain to coding efficiency. However, when in-tree quantization is enabled, the gain of the angular mode reduces considerably, and in some cases actually produces a loss. For the angular modes (IDCM angular and planar angular), the quantized bits are used for context derivation. The quantized bits are not in the same domain as the original points and are in a different scale space. This reduces the usefulness of both angular mode and in-tree quantization because it may not be beneficial to enable them at the same time.

This disclosure describes techniques that may address some of the problems introduced above. The various techniques described herein may be performed either individually or in combination.

According to techniques of this disclosure, G-PCC encoder 200 and G-PCC decoder 300 may be configured to derive, for a point/position coordinate value x, a scaled value xS for coordinate of node/point positions to derive a position of the node/point with regard to the lidar origin. In some examples, the scaling operation may include scaling one or more bits of the position and may additionally include a maximum number of bit values that are scaled, with the maximum number being based on a signaled value, such as a value derived from a maximum depth at which the quantization is to be applied. In some examples, similar scaled positions may also be derived for y or z coordinates, or in some cases two or more coordinates.

According to techniques of this disclosure, G-PCC encoder 200 and G-PCC decoder 300 use the scaled value to determine the relative position of the node with respect to the LIDAR head position, or more generally, an origin position. G-PCC encoder 200 and G-PCC decoder 300 may, for example, determine the scaled value to be used based on whether any quantization has been applied on that node position/coordinate. In some examples, G-PCC encoder 200 and G-PCC decoder 300 may use a scaled value when the node position/coordinate value is in a domain that is not the same as the head position. For example, if a node coordinate x_0 and head position h_0 are described in the same domain (scale), and the value of x_0 is modified to be x by the application of quantization, then the scaled value is used for determining the relative position with regard to the LIDAR head.

According to techniques of this disclosure, G-PCC encoder 200 and G-PCC decoder 300 compute laser characteristics using one or more scaled coordinate values. The laser characteristic may include, for example, elevation angle (angle made by the laser with respect to the x-y plane) or laser head offset. The laser characteristic may include an azimuth, or an azimuth prediction.

According to techniques of this disclosure, G-PCC encoder 200 and G-PCC decoder 300 may be configured to perform the scaling operation without clipping. For example, the MSB bits of the position may be added with the scaled values of the LSB-portion of the bits. In some scenarios, G-PCC encoder 200 and G-PCC decoder 300 may apply clipping, in which case, the MSB bits of the position are added with a clipped version of the scaled value of the LSB-portion of bits. In some examples, some scaling operations may include clipping, whereas other scaling operations may not apply clipping. This may be determined by the coordinate that is coded, the depth at which QP is applied and the QP value.

According to techniques of this disclosure, G-PCC encoder 200 and G-PCC decoder 300 may be configured to restrict angular modes (entirely or partially) based on the value of qpDivFactorLog2. For example, when the value of qpDivFactorLog2 is 0, 1, or 2, G-PCC encoder 200 and G-PCC decoder 300 may be configured to disable angular modes (entirely or partially)—i.e., only when powers of two step sizes are allowed for geometry quantization/scaling.

In some examples, G-PCC encoder 200 and G-PCC decoder 300 may be configured to enable angular mode (for instance indicated in a parameter set, e.g. GPS) only when the QP value of all nodes that are referring to the parameter set correspond to step sizes that are powers of two. In another example, when in-tree geometry scaling is enabled (e.g., by setting geom_scaling_enabled_flag_equal to 1), G-PCC encoder 200 and G-PCC decoder 300 may be configured to disable angular modes either entirely or partially. In the examples above, partial disabling of angular mode may include one or more of disabling context derivation of the planar mode-related parameters (or bits) using angular mode and disabling context derivation of the IDCM mode-related parameters (or bits) using angular mode.

According to techniques of this disclosure, G-PCC encoder 200 and G-PCC decoder 300 may be configured to modify the context derivation for angular modes based on the QP value for a particular node. In one example, one or more threshold values used in the context derivation may be specified based on QP value (such as a function of QP). The thresholds may, for instance, be unchanged for QP value of 0 but modified when QP is greater than 0. In other examples, the thresholds may be unchanged for QP value that results in a step-size that is a power of 2 but modified otherwise.

The modified QP value may be specified with a table of QP value and a scale factor and/or offset to modify the threshold. For example, when modified with respect to QP, a fixed multiple may be used to scale the thresholds (for non-zero QP, double the threshold). In another example, the threshold "z" may be modified as z_mod=func (z, QP), where func( ) is a pre-determined function, or a function indicated in the bitstream. E.g., func(z, QP)=a(QP)*z+b (QP), where a(QP) and b(QP) are parameters set based on QP value (function a( ) or b( ) may be a linear or non-linear function).

The modification of the threshold may apply to one or more of the three components x, y, or z. The modification may apply to one or more of contexts associated with theta/laser angle or context associated with azimuth. The modification of threshold may apply to one or more of planar angular mode and angular IDCM mode.

According to techniques of this disclosure, G-PCC encoder 200 and G-PCC decoder 300 may be configured to use one or more thresholds to determine whether to enable angular mode or not and may modify the one or more thresholds based on the QP using one or more of the techniques used for context derivation. (E.g., if angular mode is disabled when the node size is larger than a threshold, then that threshold may be modified based on QP such as doubling the threshold for certain QP values).

One example implementation uses the scaled point values to determine the relative position with regard to LIDAR node. Throughout this disclosure, additions are shown in between the identifiers <add> and </add>, and deletions are shown between the identifiers <del> and </del>.

G-PCC encoder 200 and G-PCC decoder 300 may be configured to determine a planar mode context.

A function invQuantPositionAngular is defined which applies the scaling operation for the three coordinates of a point based on step size derived from qp, and on the bits indicated by quantMasks. This function may be defined as follows; in this example the scaling operation is similar to the inverse scaling operation defined for in-tree quantization, but any generical scaling operation may be applied. The quantMasks is a set of 1 s and 0 s, that indicate which bits of the node position is to be scaled. For example if the quantMasks=00000111, then only the last three bits are scaled. In this example, after scaling operation, unscaled part of the position and scaled part of the position are added to form the "scaled" position. The unscaled portion may be shifted before adding to the scaled portion.

```
<add>
invQuantPositionAngular(int qp, Vec3<uint32_t> quantMasks, const
Vec3<int32_t>& pos)
{
    QuantizerGeom quantizer(qp);
    int shiftBits = QuantizerGeom::qpShift(qp);
    Vec3<int64_t> recon;
    for (int k= 0; k < 3; k++) {
        int lowPart = (pos[k] & quantMasks[k]) >> shiftBits;
        int highPart = pos[k] & ~(quantMasks[k]);
        int lowPartScaled = PCCClip(quantizer.scale(lowPart), 0, quantMasks[k]);
        recon[k] = highPart | lowPartScaled;
    }
    return recon;
</add>
```

In some examples, this process is applied only when the qp is non-zero. In other examples, the PCCClip( ) operation may not be performed and the recon[ ] variable is obtained by adding the highPart and lowPartSCaled as follows
<add>int lowPartScaled=quantizer.scale(lowPart)
recon[k]=highPart+lowPartScaled; </add>

In the determination of the context for the planar variable, G-PCC encoder 200 and G-PCC decoder 300 apply the scaling operation on the position of the child node absPos, midNode (which denotes half the size of the node) and the childSize (which denotes the size of the node)—the scaled version of these values are used in the context derivation process.

```
{
    Vec3<int64_t> absPos = {child.pos[0] << childSizeLog2[0],
            child.pos[1] << childSizeLog2[1],
            child.pos[2] << childSizeLog2[2]};
    // eligibility
    Vec3<int64_t> midNode = {1 << (childSizeLog2[0] ? childSizeLog2[0] – 1 : 0),
            1 << (childSizeLog2[1] ? childSizeLog2[1] – 1 : 0),
            1 << (childSizeLog2[2] ? childSizeLog2[2] – 1 : 0)};
<add>
    Vec3<int64_t> childSize = {
        1 << childSizeLog2[0], 1 << childSizeLog2[1], 1 << childSizeLog2[2]};
    if (child.qp) {
        absPos = invQuantPositionAngular(child.qp, quantMasks, absPos);
        midNode = invQuantPositionAngular(child.qp, quantMasks, midNode);
        childSize = invQuantPositionAngular(child.qp, quantMasks, childSize);
    }
</add>
    uint64_t xLidar =
        std::abs(((absPos[0] – headPos[0] + midNode[0]) << 8) – 128);
    uint64_t yLidar =
        std::abs(((absPos[1] – headPos[1] + midNode[1]) << 8) – 128);
    uint64_t rL1 = (xLidar + yLidar) >> 1;
    uint64_t deltaAngleR = deltaAngle * rL1;
    if (deltaAngleR <= (midNode[2] << 26))
        return –1;
    // determine inverse of r (1/sqrt(r2) = irsqrt(r2))
    uint64_t r2 = xLidar * xLidar + yLidar * yLidar;
    uint64_t rInv = irsqrt(r2);
```

```
// determine non-corrected theta
int64_t zLidar = ((absPos[2] - headPos[2] + midNode[2]) << 1) - 1;
int64_t theta = zLidar * rInv;
int theta32 = theta >= 0 ? theta >> 15 : -((-theta) >> 15);
// determine laser
int laserIndex = int(child.laserIndex);
if (laserIndex == 255 || deltaAngleR <= (midNode[2] << (26 + 2))) {
   auto end = thetaLaser + numLasers - 1;
   auto it = std::upper_bound(thetaLaser + 1, end, theta32);
   if (theta32 - *std::prev(it) <= *it - theta32)
      --it;
   laserIndex = std::distance(thetaLaser, it);
   child.laserIndex = uint8_t(laserIndex);
}
// -- PHI --
//angles
int posx = absPos[0] - headPos[0];
int posy = absPos[1] - headPos[1];
int phiNode = iatan2(posy + midNode[1], posx + midNode[0]);
int phiNode0 = iatan2(posy, posx);
// find predictor
int predPhi = phiBuffer[laserIndex];
if (predPhi == 0x80000000)
   predPhi = phiNode;
// use predictor
if (predPhi != 0x80000000) {
   // elementary shift predictor
   int Nshift =
       ((predPhi - phiNode) * phiZi.invDelta(laserIndex) + 536870912) >> 30;
   predPhi -= phiZi.delta(laserIndex) * Nshift;
   // ctx azimutal x or y
   int angleL = phiNode0 - predPhi;
   int angleR = phiNode - predPhi;
   int contextAnglePhi =
       (angleL >= 0 && angleR >= 0) || (angleL < 0 && angleR < 0) ? 2 : 0;
   angleL = std::abs(angleL);
   angleR = std::abs(angleR);
   if (angleL > angleR) {
      contextAnglePhi++;
      int temp = angleL;
      angleL = angleR;
      angleR = temp;
   }
   if (angleR > (angleL << 2))
      contextAnglePhi += 4;
   if (std::abs(posx) <= std::abs(posy))
      *contextAnglePhiX = contextAnglePhi;
   else
      *contextAnglePhiY = contextAnglePhi;
}
// -- THETA --
int thetaLaserDelta = thetaLaser[laserIndex] - theta32;
int64_t hr = zLaser[laserIndex] * rInv;
thetaLaserDelta += hr >= 0 ? -(hr >> 17) : ((-hr) >> 17);
<del> int64_t zShift = (rInv << childSizeLog2[2]) >> 20; </del>
  <add>int64_t zShift = (rInv * childSize[2]) >> 20; </add>
int thetaLaserDeltaBot = thetaLaserDelta + zShift;
int thetaLaserDeltaTop = thetaLaserDelta - zShift;
int contextAngle = thetaLaserDelta >= 0 ? 0 : 1;
if (thetaLaserDeltaTop >= 0)
   contextAngle += 2;
else if (thetaLaserDeltaBot < 0)
   contextAngle += 2;
return contextAngle;
}
```

In some examples, G-PCC encoder 200 and G-PCC decoder 300 may be configured to implement the zShift with multiplication only when scaling step size (derived from QP) is not a power of 2. Otherwise, (step size is a power of 2) zShift is implemented as a shift operation (as shown above).

This disclosure describes changes for IDCM angular contexts. An inverse scale function is defined as follows, where the scaling operation is similar to the function defined previously, and an argument to the function (noClip) determines whether clipping is to be applied or not.

```
class InvQuantizer {
  int qp;
  Vec3<uint32_t> quantMasks;
public:
  InvQuantizer(int qpVal, Vec3<uint32_t> quantMaskInp)
    : qp(qpVal), quantMasks(quantMaskInp)
  { }
  int32_t invQuantPositionComp(
    int idx, const int32_t& pos, bool noClip = false)
  {
    if (!qp)
      return pos;
    QuantizerGeom quantizer(qp);
    int shiftBits = QuantizerGeom::qpShift(qp);
    int32_t recon;
    int lowPart = pos & (quantMasks[idx] >> shiftBits);
    int highPart = pos ^ lowPart;
    int lowPartScaled = quantizer.scale(lowPart);
```

-continued

```
    if (!noClip)
      lowPartScaled = PCCClip(lowPartScaled, 0, quantMasks[idx]);
    recon = (highPart << shiftBits) + lowPartScaled;
    return recon;
  }
};
```

In some examples, the recon variable may be derived as follows:

recon=(highPart<<shiftBits)|lowPartScaled;

G-PCC encoder 200 and G-PCC decoder 300 may be configured to determine nodePosition and laser index, for example, in a similar manner as described above.

G-PCC decoder 300 may initialize the scaling operation (also referred to as inverse quantization) with the QP of the node and the quantization mask applicable to the point positions as follows:

<add> InvQuantizer invQuantizerIDCM(child.qp, posQuantBitMasks); </add>

In the following code, wherever the position of the node with regard to the LIDAR origin is to be estimated, the scaled value of the positions are used. This ensures that the relative position with regard to the LIDAR origin is properly estimated, and the laser index, elevation and azimuth are calculated properly. When the node position is updated, by adding a mask value or a node size, the added value is also inverse quantized before addition (or in some cases, the value is added to the unquantized position and then scaled).

```
    int numPoints = 1;
    bool numPointsGt1 = arithmeticDecoder->decode(_ctxNumIdemPointsGt1);
    numPoints += numPointsGt1;
    int numDuplicatePoints = 0;
    if (!geom_unique_points_flag && !numPointsGt1) {
      numDuplicatePoints = !_arithmeticDecoder-
>decode(_ctxSinglePointPerBlock);
      if (numDuplicatePoints) {
        bool singleDup = arithmeticDecoder->decode(_ctxSingleIdcmDupPoint);
        if (!singleDup)
          numDuplicatePoints +=
            1 + _arithmeticDecoder->decodeExpGolomb(0,
_ctxPointCountPerBlock);
      }
    }
    // update node size after planar and determine upper part of position from
planar
    Vec3<int32_t>deltaPlanar{0, 0, 0};
    Vec3<int> nodeSizeLog2Rem = nodeSizeLog2;
    for (int k = 0; k < 3; k++)
      if (nodeSizeLog2Rem[k] > 0 && (planar.planarMode & (1 << k))) {
        deltaPlanar[k] |= (planar.planePosBits & (1 << k)) ? 1 : 0);
        nodeSizeLog2Rem[k]--;
      }
    // Indicates which components are directly coded, or coded using angular
    // contextualisation.
    Vec3<bool> directIdcm = !angularIdcm;
    point_t posNodeLidar;
    if (angularIdcm) {
      posNodeLidar =
        point_t(
          node.pos[0] << nodeSizeLog2[0], node.pos[1] << nodeSizeLog2[1],
          node.pos[2] << nodeSizeLog2[2])
        <del>- headPos; </del>
      <add> if (node.qp)
        posNodeLidar =
          invQuantPosition(node.qp, posQuantBitMasks, posNodeLidar);
      posNodeLidar -= headPos; </add>
      bool codeXorY = std::abs(posNodeLidar[0]) <= std::abs(posNodeLidar[1]);
      directIdcm.x( ) = !codeXorY;
      directIdcm.y( ) = codeXorY;
    }
    // decode nonordred two points
    Vec3<int32_t> deltaPos[2];
```

```
        deltaPos[0] = deltaPlanar;
        deltaPos[1] = deltaPlanar;
        if (numPoints == 2 && joint_2pt_idcm_enabled_flag)
            decodeOrdered2ptPrefix(directIdcm, nodeSizeLog2Rem, deltaPos);
        if (angularIdcm) {
            <add> InvQuantizer invQuantizerIDCM(node.qp, posQuantBitMasks); </add>
            for (int idx = 0; idx < 3; ++idx) {
                <add> int delta = 0; </add>
                int N = nodeSizeLog2[idx] - nodeSizeLog2Rem[idx];
                for (int mask = N ? 1 << (N - 1) : 0; mask; mask >>= 1) {
                    if (deltaPos[0][idx] & mask)
                        <add> delta</add><del>posNodeLida[idx]</del> += mask <<
nodeSizeLog2Rem[idx];
                }
                if (nodeSizeLog2Rem[idx])
                    <add> delta</add> <del>posNodeLidar[idx] </del> += 1 <<
(nodeSizeLog2Rem[idx] - 1);
                <add> posNodeLidar[idx] +=</add>
                    <add> invQuantizerIDCM.invQuantPositionComp(idx, delta, true); </add>
            }
            node.laserIndex = findLaser(posNodeLidar, thetaLaser, numLasers);
        }
        Vec3<int32_t> pos;
        for (int i = 0; i < numPoints; i++) {
            if (angularIdcm) {
                *(outputPoints++) = pos = decodePointPositionAngular(
                    nodeSizeLog2, nodeSizeLog2Rem, node, planar, headPos, zLaser,
                    thetaLaser, deltaPos[i]);
            } else
                *(outputPoints++) = pos =
                    decodePointPosition(nodeSizeLog2Rem, deltaPos[i]);
        }
        for (int i = 0; i < numDuplicatePoints; i++)
            *(outputPoints++) = pos;
        return numPoints + numDuplicatePoints;
```

G-PCC encoder 200 and G-PCC decoder 300 may be configured to determine the contexts for angular IDCM.

Similar to above, when the position of the node with regard to the LIDAR head position is compared, the scaled version of the node size and node positions are used.

```
    {
        Vec3<int32_t> delta = deltaPlanar;
    <del>
        Vec3<int> posXyz = {(child.pos[0] << nodeSizeLog2[0]) - headPos[0],
            (child.pos[1] << nodeSizeLog2[1]) - headPos[1],
            (child.pos[2] << nodeSizeLog2[2]) - headPos[2]};
    </del>
    <add>
Vec3<int> posXyz = {
        (child.pos[0] << nodeSizeLog2[0]), (child.pos[1] << nodeSizeLog2[1]),
        (child.pos[2] << nodeSizeLog2[2])};
        Vec3<int> posXyzBeforeQuant = posXyz;
        if (child.qp)
            posXyz = invQuantPosition(child.qp, posQuantBitMasks, posXyz);
        posXyz -= headPos;
    </add>
    // -- PHI --
    // code x or y directly and compute phi of node
    bool codeXorY = std::abs(posXyz[0]) <= std::abs(posXyz[1]);
    if (codeXorY) { // direct code y
        if (nodeSizeLog2AfterPlanar[1])
            for (int i = nodeSizeLog2AfterPlanar[1]; i > 0; i--) {
                delta[1] <<= 1;
                delta[1] |= arithmeticDecoder->decode( );
            }
    <del>
        posXyz[1] += delta[1];
        posXyz[0] += delta[0] << nodeSizeLog2AfterPlanar[0];
    </del>
    <add>
    posXyz[1] =
        invQuantizerIDCM.invQuantPositionComp(1, posXyzBeforeQuant[1] +
delta[1])
```

```
                - headPos[1];
            posXyz[0] += invQuantizerIDCM.invQuantPositionComp(
                0, delta[0] << nodeSizeLog2AfterPlanar[0], true);
    </add>
    } else { //direct code x
        if (nodeSizeLog2AfterPlanar[0])
            for (int i = nodeSizeLog2AfterPlanar[0]; i > 0; i--) {
                delta[0] <<= 1;
                delta[0] 1= arithmeticDecoder->decode( );
            }
    <del>
        posXyz[0] += delta[0];
        posXyz[1] += delta[1] << nodeSizeLog2AfterPlanar[1];
    </del>
    <add>
 posXyz[0] =
        invQuantizerIDCM.invQuantPositionComp(0, posXyzBeforeQuant[0] +
delta[0])
            - headPos[0];
        posXyz[1] += invQuantizerIDCM.invQuantPositionComp(
            1, delta[1] << nodeSizeLog2AfterPlanar[1], true);
    </add>
        }
        // find predictor
        int phiNode = iatan2(posXyz[1], posXyz[0]);
        int laserNode = int(childlaserIndex);
        // laser residual
        int laserIndex = laserNode + decodeThetaRes( );
        int predPhi = _phiBuffer[laserIndex];
        if (predPhi == 0x80000000)
            predPhi = phiNode;
        // elementary shift predictor
        int nShift =
            ((predPhi - phiNode) * _phiZi.invDelta(laserIndex) + 536870912) >> 30;
        predPhi -= _phiZi.delta(laserIndex) * nShift;
        // choose x or y
        int* posXY = codeXorY ? &posXyz[0] : &posXyz[1];
        int idx = codeXorY ? 0 : 1;
        // azimuthal code x or y
        int mask2 = codeXorY
            ? (nodeSizeLog2AfterPlanar[0] > 0 ? 1 << (nodeSizeLog2AfterPlanar[0] - 1)
                    : 0)
            : (nodeSizeLog2AfterPlanar[1] > 0 ? 1 << (nodeSizeLog2AfterPlanar[1] - 1)
                    : 0);
        for (; mask2; mask2 >>= 1) {
            // angles left and right
    <del>
            int phiR = codeXorY ? iatan2(posXyz[1], posXyz[0] + mask2)
                    : iatan2(posXyz[1] + mask2, posXyz[0]);
    </del>
    <add>
int32_t scaledMask =
        invQuantizerIDCM.invQuantPositionComp(codeXorY ? 0 : 1, mask2, true);
            int phiR = codeXorY ? iatan2(posXyz[1], posXyz[0] + scaledMask)
                    : iatan2(posXyz[1] + scaledMask, posXyz[0]);
    </add>
            int phiL = phiNode;
            // ctx azimutal
            int angleL = phiL - predPhi;
            int angleR = phiR - predPhi;
            int contextAnglePhi =
                (angleL >= 0 && angleR >= 0) || (angleL < 0 && angleR < 0) ? 2 : 0;
            angleL = std::abs(angleL);
            angleR = std::abs(angleR);
            if (angleL > angleR) {
                contextAnglePhi++;
                int temp = angleL;
                angleL = angleR;
                angleR = temp;
            }
            if (angleR > (angleL << 1))
                contextAnglePhi += 4;
            // entropy coding
            bool bit = arithmeticDecoder->decode(
                _ctxPlanarPlaneLastIndexAngularPhiDCM[contextAnglePhi]);
            delta[idx] <<= 1;
            if (bit) {
                delta[idx] |= 1;
                <del>*posXY += mask2; </del>
```

```
        <add> *posXY += invQuantizerIDCM.invQuantPositionComp(idx, mask2,
true); </add>
          phiNode = phiR;
          predPhi = _phiBuffer[laserIndex];
          if (predPhi == 0x80000000)
            predPhi = phiNode;
          // elementary shift predictor
          int nShift =
            ((predPhi - phiNode) * _phiZi.invDelta(laserIndex) + 536870912) >> 30;
          predPhi -= _phiZi.delta(laserIndex) * nShift;
        }
      }
      // update buffer phi
      _phiBuffer[laserIndex] = phiNode;
      // -- THETA --
      int maskz =
        nodeSizeLog2AfterPlanar[2] > 0 ? 1 << (nodeSizeLog2AfterPlanar[2] - 1) : 0;
      if (!maskz)
        return delta;
      int posz0 = posXyz[2];
    <del> posXyz[2] += delta[2] << nodeSizeLog2AfterPlanar[2];</del>
    <add>
posXyz[2] += invQuantizerIDCM.invQuantPositionComp(
        2, delta[2] << nodeSizeLog2AfterPlanar[2], true);
    </add>
      // Since x and y are known,
      // r is known too and does not depend on the bit for z
      uint64_t xLidar = (int64_t(posXyz[0]) << 8) - 128;
      uint64_t yLidar = (int64_t(posXyz[1]) << 8) - 128;
      uint64_t r2 = xLidar * xLidar + yLidar * yLidar;
      int64_t rInv = irsqrt(r2);
      // code bits for z using angular. Eligibility is implicit. Laser is known.
      int64_t hr = zLaser[laserIndex] * rInv;
      int fixedThetaLaser =
        thetaLaser[laserIndex] + int(hr >= 0 ? -(hr >> 17) : ((-hr) >> 17));
    <del> int zShift = (rInv << nodeSizeLog2AfterPlanar[2]) >> 18; </del>
    <add>
int zShift = (child.qp ? (
          rInv
          * invQuantizerIDCM.invQuantPositionComp(
            2, 1 << nodeSizeLog2AfterPlanar[2], true))
          : (rInv << nodeSizeLog2AfterPlanar[2]))
        >> 18;
    </add>
      for (int bitIdxZ = nodeSizeLog2AfterPlanar[2]; bitIdxZ > 0;
           bitIdxZ--, maskz >>= 1, zShift >>= 1) {
        // determine non-corrected theta
        <del> int64_t zLidar = ((posXyz[2] + maskz) << 1) - 1; </del>
    <add> int scaledMaskZ = invQuantizerIDCM.invQuantPositionComp(2, maskz,
true); </add>
        <add>int64_t zLidar = ((posXyz[2]+ scaledMaskZ) << 1) - 1; </add>
        int64_t theta = zLidar * rInv;
        int theta32 = theta >= 0 ? theta >> 15 : -((-theta) >> 15);
        int thetaLaserDelta = fixedThetaLaser - theta32;
        int thetaLaserDeltaBot = thetaLaserDelta + zShift;
        int thetaLaserDeltaTop = thetaLaserDelta - zShift;
        int contextAngle = thetaLaserDelta >= 0 ? 0 : 1;
        if (thetaLaserDeltaTop >= 0)
          contextAngle += 2;
        else if (thetaLaserDeltaBot < 0)
          contextAngle += 2;
        delta[2] <<= 1;
        delta[2] |= _arithmeticDecoder->decode(
          _ctxPlanarPlaneLastIndexAngularIdcm[contextAngle]);
    <del>posXyz[2] = posz0 + (delta[2] << (bitIdxZ - 1)); </del>
    <add> if (delta[2] & 1) </add>
        <add> posXyz[2] += scaledMaskZ; </add>
      }
      return delta;
    }
```

The rest of the derivation is similar to what was described above.

The following example shows an implementation where the threshold for context of the z coordinate in planar angular mode is updated (with the updated portion identified in between  and ) as follows:

```
Vec3<int64_t> childSize = {
  1 << childSizeLog2[0], 1 << childSizeLog2[1], 1 << childSizeLog2[2]};
if (child.qp) {
  absPos = invQuantPositionAngular(child.qp, quantMasks, absPos);
  midNode = invQuantPositionAngular(child.qp, quantMasks, midNode);
```

-continued

```
    childSize = invQuantPositionAngular(child.qp, quantMasks, childSize);
    **childSize[2] = 2*childSize[2];**
}
```

In this example, the rest of the changes shown in the examples above may also remain.

Examples in the various aspects of this disclosure may be used individually or in any combination.

Figure 9A:
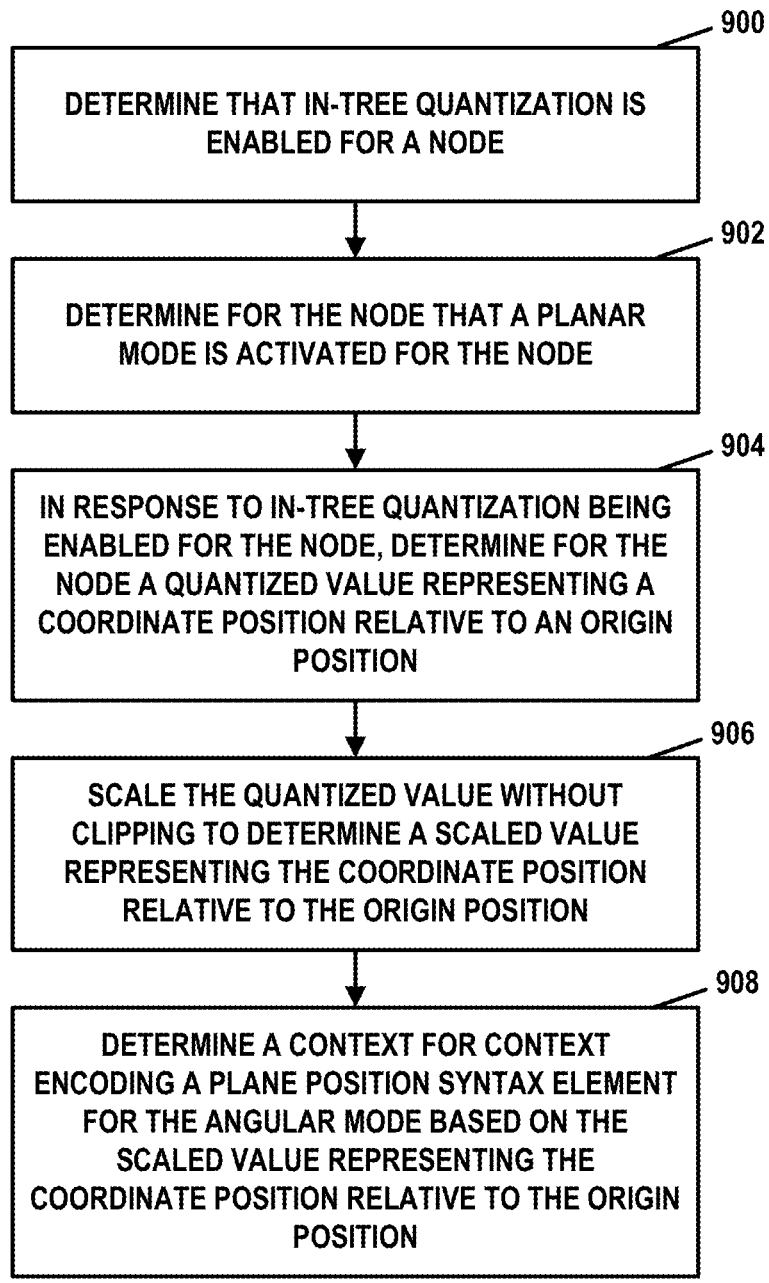
FIG. 9A is a flowchart illustrating an example operation for coding a vertical plane position in accordance with one or more techniques of this disclosure.

FIG. 9A is a flowchart illustrating an example operation of G-PCC encoder 200 in accordance with one or more techniques of this disclosure. G-PCC encoder 200 determines that in-tree quantization is enabled for a node (900). G-PCC encoder 200 determines that a planar mode is activated for the node (902). In response to in-tree quantization being enabled for the node, G-PCC encoder 200 determines for the node a quantized value representing a coordinate position relative to an origin position (904). G-PCC encoder 200 scales the quantized value without clipping to determine a scaled value representing the coordinate position relative to the origin position (906).

To scale the quantized value without clipping to determine the scaled value representing the coordinate position relative to the origin position, G-PCC encoder 200 may be configured to determine a group of most significant bits (MSBs) and a group of least significant bits (LSBs); scale the LSBs without clipping to determine scaled LSBs; and add the scaled LSBs to the MSBs to determine the scaled value representing the coordinate position relative to the origin position. To scale the quantized value without clipping to determine the scaled value representing the coordinate position relative to the origin position, G-PCC encoder 200 may be configured to determine an amount of shift for the MSBs based on a quantization parameter for the node; shift the MSBs based on the amount of shift; and add the scaled LSBs to the shifted MSBs to determine the scaled value representing the coordinate position relative to the origin position. G-PCC encoder 200 may, for example, receive, in the syntax signaled in the bitstream, an indication of a number of bits in the group of LSBs. The indication may either be an explicit or an implicit indication. As one example, based on a received node depth, G-PCC encoder 200 may be configured to derive the number of MSBs and LSBs.

G-PCC encoder 200 determines a context for context encoding a plane position syntax element for the angular mode based on the scaled value representing the coordinate position relative to the origin position (908). The plane position syntax element may, for example, indicate a vertical plane position. To determine the context for context encoding the plane position syntax element for the angular mode based on the scaled value representing the coordinate position relative to the origin position, G-PCC encoder 200 may be configured to determine one or more laser characteristics based on the scaled value and the origin position and encode the plane position syntax element for the angular mode based on the laser characteristics. To determine a context for context encoding the plane position syntax element for the angular mode based on the laser characteristics, G-PCC encoder 200 may be configured to determine a context index based on whether a laser beam with the determined one or more laser characteristics is above a first distance threshold, between the first distance threshold and a second distance threshold, between the second distance threshold and a third distance threshold, or below the third distance threshold.

Steps 904, 906, and 908 above may, for example, be performed as part of a decoding operation performed by G-PCC encoder 200. G-PCC encoder 200 may perform decoding as part of encoding. For example, to determine if a particular encoding scheme provides a desirable rate-distortion tradeoff, G-PCC encoder 200 may encode point cloud data and then decode the encoded point cloud data so that the decoded point cloud data can be compared to the original point cloud data to determine an amount of distortion. G-PCC encoder 200 may also encode point cloud data and then decode the encoded point cloud data so that when using various predictive coding tools, G-PCC encoder 200 can perform the prediction based off the same point cloud data that will be available to the G-PCC decoder.

Figure 9B:
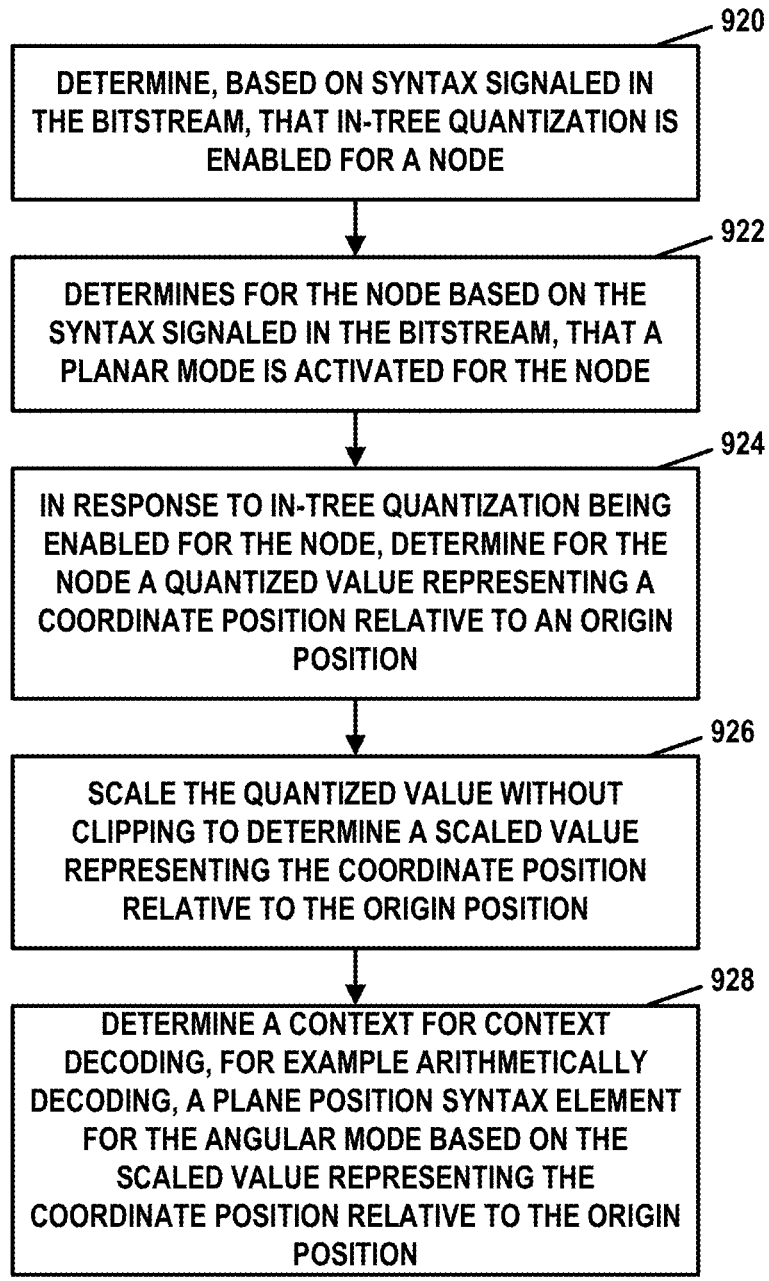
FIG. 9B is a flowchart illustrating an example operation for coding a vertical plane position in accordance with one or more techniques of this disclosure.

FIG. 9B is a flowchart illustrating an example operation of G-PCC decoder 300 in accordance with one or more techniques of this disclosure. G-PCC decoder 300 determines, based on syntax signaled in the bitstream, that in-tree quantization is enabled for a node (920). G-PCC decoder 300 determines for the node based on the syntax signaled in the bitstream, that a planar mode is activated for the node (922). In response to in-tree quantization being enabled for the node, G-PCC decoder 300 determines for the node a quantized value representing a coordinate position relative to an origin position (924).

G-PCC decoder 300 scales the quantized value without clipping to determine a scaled value representing the coordinate position relative to the origin position (906).

To scale the quantized value without clipping to determine the scaled value representing the coordinate position relative to the origin position, G-PCC decoder 300 may be configured to determine a group of most significant bits (MSBs) and a group of least significant bits (LSBs); scale the LSBs without clipping to determine scaled LSBs; and add the scaled LSBs to the MSBs to determine the scaled value representing the coordinate position relative to the origin position. To scale the quantized value without clipping to determine the scaled value representing the coordinate position relative to the origin position, G-PCC decoder 300 may be configured to determine an amount of shift for the MSBs based on a quantization parameter for the node; shift the MSBs based on the amount of shift; and add the scaled LSBs to the shifted MSBs to determine the scaled value representing the coordinate position relative to the origin position. G-PCC decoder 300 may, for example, receive, in the syntax signaled in the bitstream, an indication of a number of bits in the group of LSBs. The indication may either be an explicit or an implicit indication. As one example, based on a received node depth, G-PCC decoder 300 may be configured to derive the number of MSBs and LSBs.

G-PCC decoder 300 determines a context for context decoding, for example arithmetically decoding, a plane position syntax element for the angular mode based on the scaled value representing the coordinate position relative to the origin position (928). The plane position syntax element may, for example, indicate a vertical plane position. To determine the context for context decoding the plane position syntax element for the angular mode based on the scaled value representing the coordinate position relative to the origin position, G-PCC decoder 300 may be configured to determine one or more laser characteristics based on the scaled value and the origin position and decode the plane position syntax element for the angular mode based on the laser characteristics. To determine a context for context decoding the plane position syntax element for the angular mode based on the laser characteristics, G-PCC decoder 300 may be configured to determine a context index based on whether a laser beam with the determined one or more laser characteristics is above a first distance threshold, between the first distance threshold and a second distance threshold, between the second distance threshold and a third distance threshold, or below the third distance threshold.

G-PCC decoder 300 may be configured to reconstruct the point cloud by, for example, determining positions of one or more points of the point cloud based on the plane position.

Figure 10:
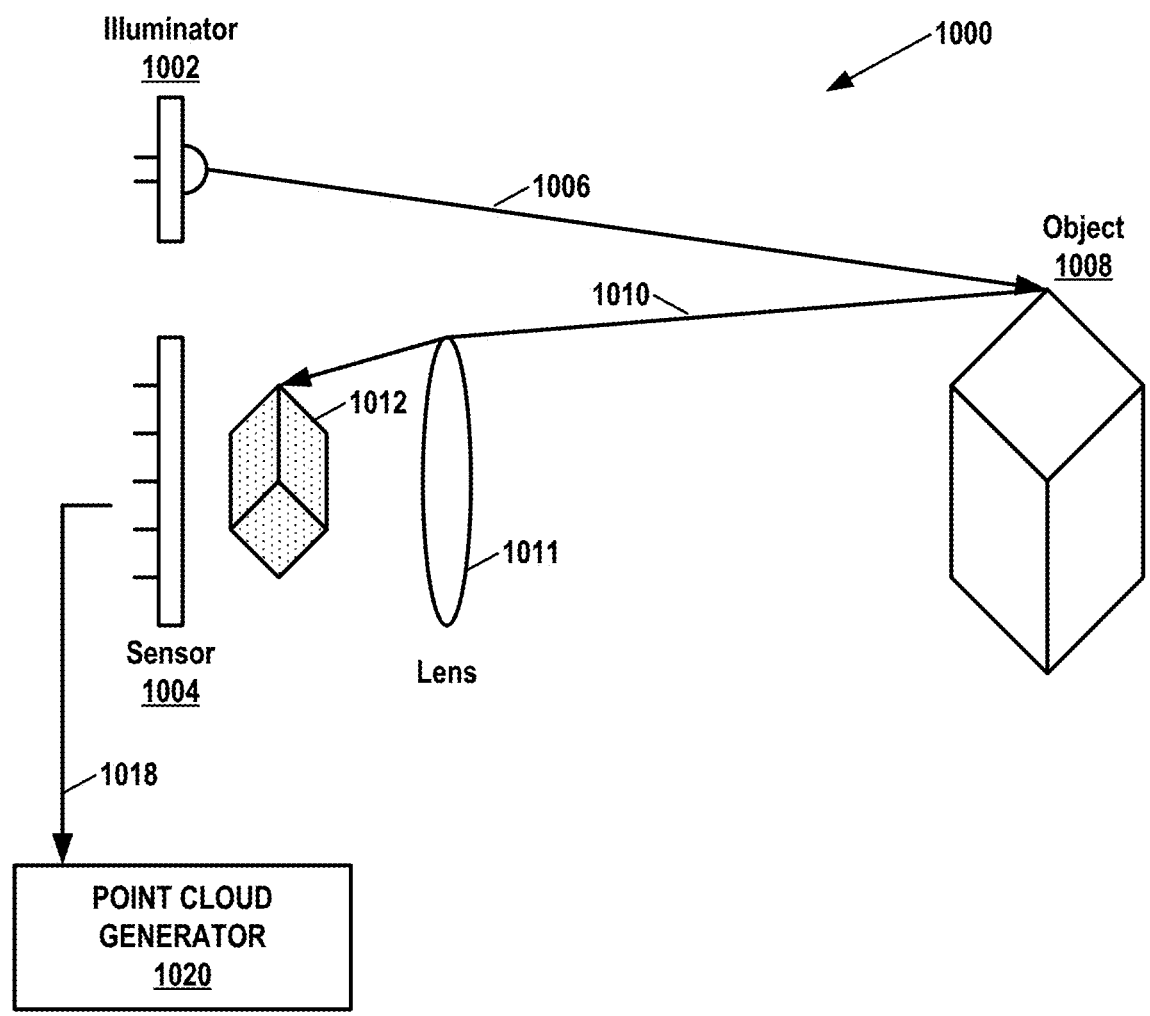
FIG. 10 is a conceptual diagram illustrating an example range-finding system that may be used with one or more techniques of this disclosure.

FIG. 10 is a conceptual diagram illustrating an example range-finding system 1000 that may be used with one or more techniques of this disclosure. In the example of FIG. 10, range-finding system 1000 includes an illuminator 1002 and a sensor 1004. Illuminator 1002 may emit light 1006. In some examples, illuminator 1002 may emit light 1006 as one or more laser beams. Light 1006 may be in one or more wavelengths, such as an infrared wavelength or a visible light wavelength. In other examples, light 1006 is not coherent, laser light. When light 1006 encounters an object, such as object 1008, light 1006 creates returning light 1010. Returning light 1010 may include backscattered and/or reflected light. Returning light 1010 may pass through a lens 1011 that directs returning light 1010 to create an image 1012 of object 1008 on sensor 1004. Sensor 1004 generates signals 1018 based on image 1012. Image 1012 may comprise a set of points (e.g., as represented by dots in image 1012 of FIG. 10).

In some examples, illuminator 1002 and sensor 1004 may be mounted on a spinning structure so that illuminator 1002 and sensor 1004 capture a 360-degree view of an environment. In other examples, range-finding system 1000 may include one or more optical components (e.g., mirrors, collimators, diffraction gratings, etc.) that enable illuminator 1002 and sensor 1004 to detect objects within a specific range (e.g., up to 360-degrees). Although the example of FIG. 10 only shows a single illuminator 1002 and sensor 1004, range-finding system 1000 may include multiple sets of illuminators and sensors.

In some examples, illuminator 1002 generates a structured light pattern. In such examples, range-finding system 1000 may include multiple sensors 1004 upon which respective images of the structured light pattern are formed. Range-finding system 1000 may use disparities between the images of the structured light pattern to determine a distance to an object 1008 from which the structured light pattern backscatters. Structured light-based range-finding systems may have a high level of accuracy (e.g., accuracy in the sub-millimeter range), when object 1008 is relatively close to sensor 1004 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 1000 is a time of flight (ToF)-based system. In some examples where range-finding system 1000 is a ToF-based system, illuminator 1002 generates pulses of light. In other words, illuminator 1002 may modulate the amplitude of emitted light 1006. In such examples, sensor 1004 detects returning light 1010 from the pulses of light 1006 generated by illuminator 1002. Range-finding system 1000 may then determine a distance to object 1008 from which light 1006 backscatters based on a delay between when light 1006 was emitted and detected and the known speed of light in air). In some examples, rather than (or in addition to) modulating the amplitude of the emitted light 1006, illuminator 1002 may modulate the phase of the emitted light 1006. In such examples, sensor 1004 may detect the phase of returning light 1010 from object 1008 and determine distances to points on object 1008 using the speed of light and based on time differences between when illuminator 1002 generated light 1006 at a specific phase and when sensor 1004 detected returning light 1010 at the specific phase.

In other examples, a point cloud may be generated without using illuminator 1002. For instance, in some examples, sensor 1004 of range-finding system 1000 may include two or more optical cameras. In such examples, range-finding system 1000 may use the optical cameras to capture stereo images of the environment, including object 1008. Range-finding system 1000 (e.g., point cloud generator 1020) may then calculate the disparities between locations in the stereo images. Range-finding system 1000 may then use the disparities to determine distances to the locations shown in the stereo images. From these distances, point cloud generator 1020 may generate a point cloud.

Sensors 1004 may also detect other attributes of object 1008, such as color and reflectance information. In the example of FIG. 10, a point cloud generator 1020 may generate a point cloud based on signals 1018 generated by sensor 1004. Range-finding system 1000 and/or point cloud generator 1020 may form part of data source 104 (FIG. 1).

Figure 11:
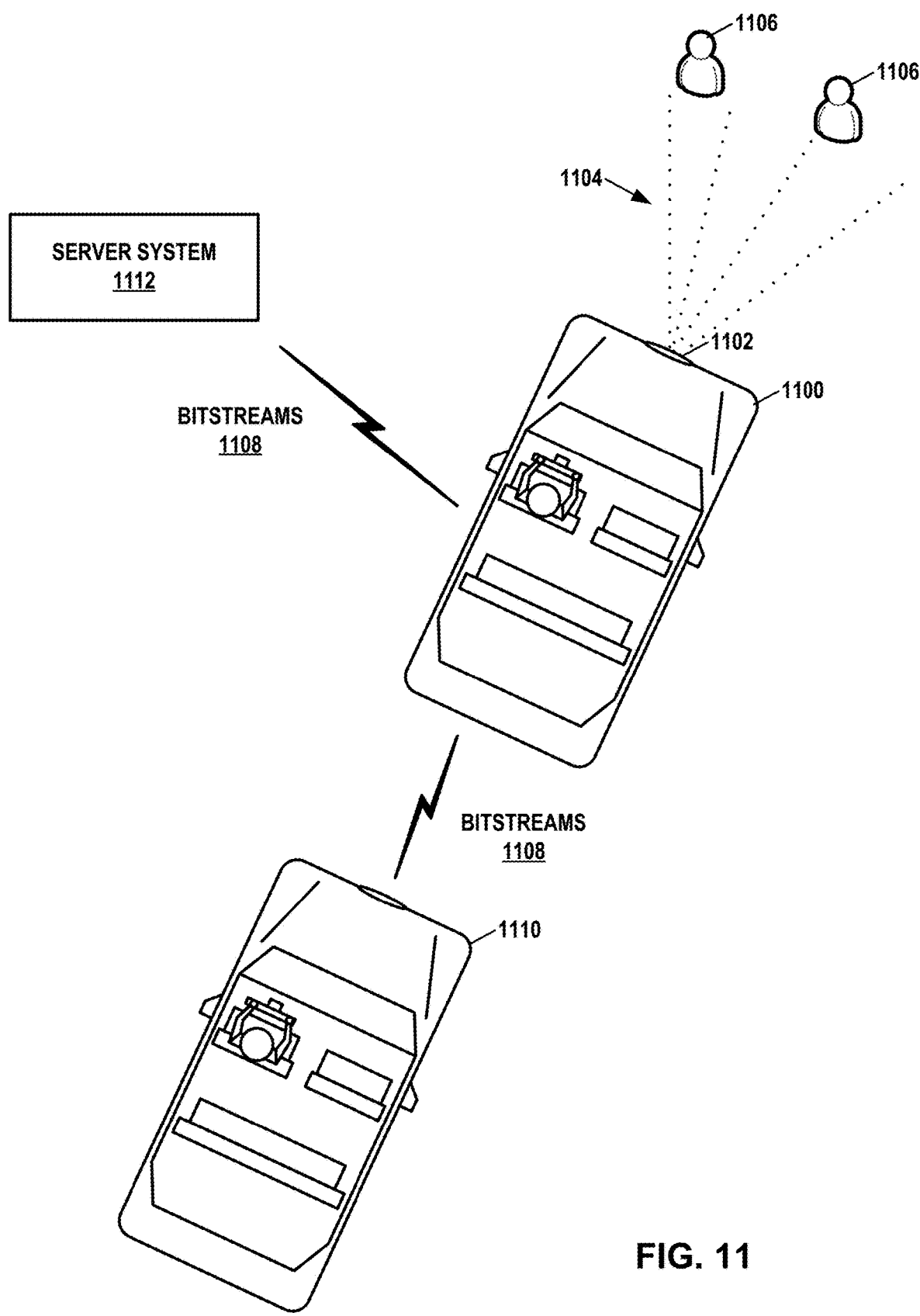
FIG. 11 is a conceptual diagram illustrating an example vehicle-based scenario in which one or more techniques of this disclosure may be used.

FIG. 11 is a conceptual diagram illustrating an example vehicle-based scenario in which one or more techniques of this disclosure may be used. In the example of FIG. 11, a vehicle 1100 includes a laser package 1102, such as a LIDAR system. Although not shown in the example of FIG. 11, vehicle 1100 may also include a data source and a G-PCC encoder, such as G-PCC encoder 200 (FIG. 1). In the example of FIG. 11, laser package 1102 emits laser beams 1104 that reflect off pedestrians 1106 or other objects in a roadway. The data source of vehicle 1100 may generate a point cloud based on signals generated by laser package 1102. The G-PCC encoder of vehicle 1100 may encode the point cloud to generate bitstreams 1108. Bitstreams 1108 may include many fewer bits than the unencoded point cloud obtained by the G-PCC encoder. An output interface of vehicle 1100 (e.g., output interface 108 (FIG. 1) may transmit bitstreams 1108 to one or more other devices. Thus, vehicle 1100 may be able to transmit bitstreams 1108 to other devices more quickly than the unencoded point cloud data. Additionally, bitstreams 1108 may require less data storage capacity.

In the example of FIG. 11, vehicle 1100 may transmit bitstreams 1108 to another vehicle 1110. Vehicle 1110 may include a G-PCC decoder, such as G-PCC decoder 300 (FIG. 1). The G-PCC decoder of vehicle 1110 may decode bitstreams 1108 to reconstruct the point cloud. Vehicle 1110 may use the reconstructed point cloud for various purposes. For instance, vehicle 1110 may determine based on the reconstructed point cloud that pedestrians 1106 are in the roadway ahead of vehicle 1100 and therefore start slowing down, e.g., even before a driver of vehicle 1110 realizes that pedestrians 1106 are in the roadway. Thus, in some examples, vehicle 1110 may perform an autonomous navigation operation, generate a notification or warning, or perform another action based on the reconstructed point cloud.

Additionally or alternatively, vehicle 1100 may transmit bitstreams 1108 to a server system 1112. Server system 1112 may use bitstreams 1108 for various purposes. For example, server system 1112 may store bitstreams 1108 for subsequent reconstruction of the point clouds. In this example, server system 1112 may use the point clouds along with other data (e.g., vehicle telemetry data generated by vehicle 1100) to train an autonomous driving system. In other example, server system 1112 may store bitstreams 1108 for subsequent reconstruction for forensic crash investigations (e.g., if vehicle 1100 collides with pedestrians 1106) or may transmit notifications or instructions for navigation to vehicle 1100 or vehicle 1110.

Figure 12:
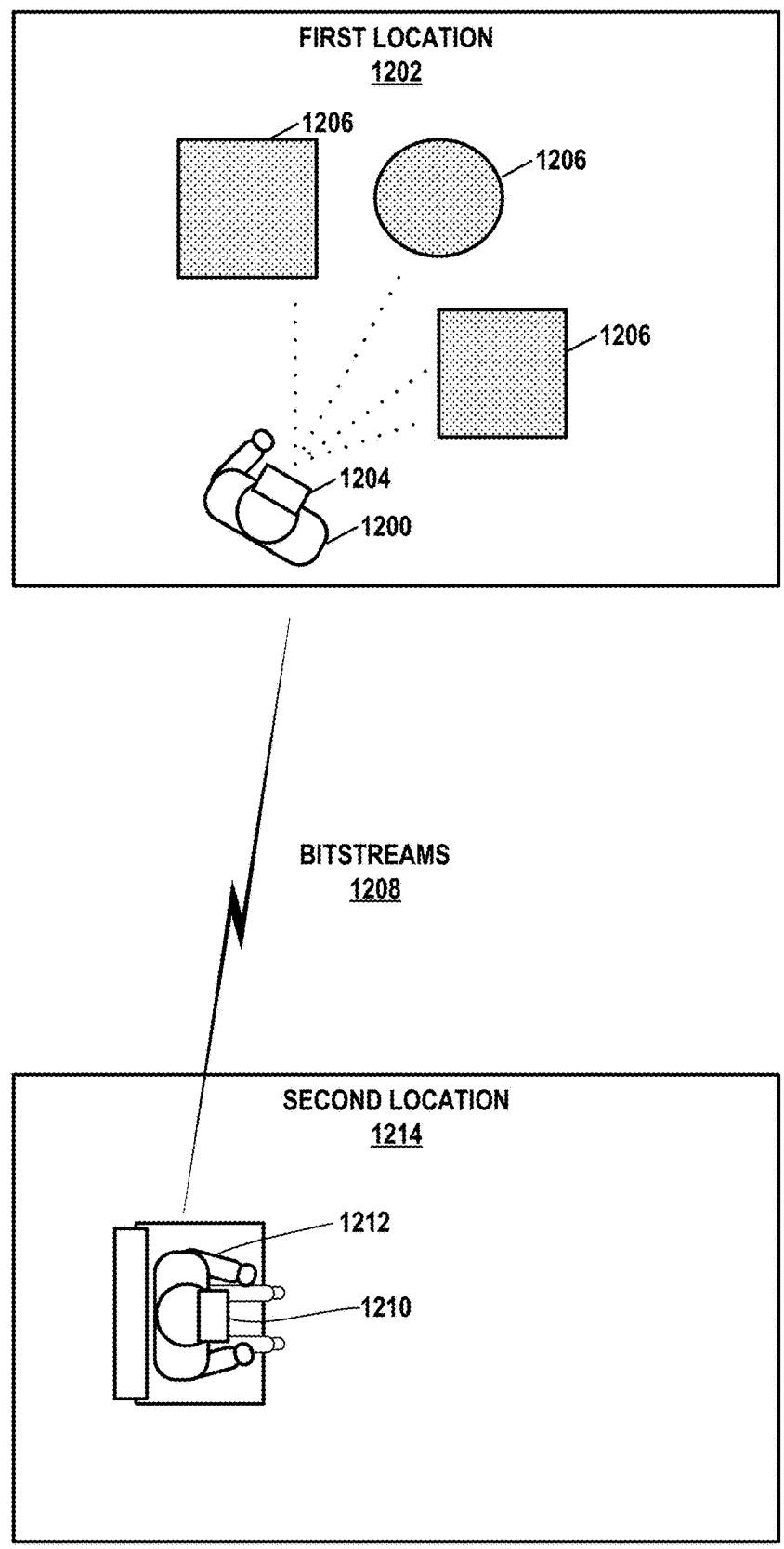
FIG. 12 is a conceptual diagram illustrating an example extended reality system in which one or more techniques of this disclosure may be used.

FIG. 12 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 12, a first user 1200 is located in a first location 1202. User 1200 wears an XR headset 1204. As an alternative to XR headset 1204, user 1200 may use a mobile device (e.g., mobile phone, tablet computer, etc.). XR headset 1204 includes a depth detection sensor, such as a LIDAR system, that detects positions of points on objects 1206 at first location 1202. A data source of XR headset 1204 may use the signals generated by the depth detection sensor to generate a point cloud representation of objects 1206 at location 1202. XR headset 1204 may include a G-PCC encoder (e.g., G-PCC encoder 200 of FIG. 1) that is configured to encode the point cloud to generate bitstreams 1208.

XR headset 1204 may transmit bitstreams 1208 (e.g., via a network such as the Internet) to an XR headset 1210 worn by a user 1212 at a second location 1214. XR headset 1210 may decode bitstreams 1208 to reconstruct the point cloud. XR headset 1210 may use the point cloud to generate an XR visualization (e.g., an AR, MR, VR visualization) representing objects 1206 at location 1202. Thus, in some examples, such as when XR headset 1210 generates a VR visualization, user 1212 at location 1214 may have a 3D immersive experience of location 1202. In some examples, XR headset 1210 may determine a position of a virtual object based on the reconstructed point cloud. For instance, XR headset 1210 may determine, based on the reconstructed point cloud, that an environment (e.g., location 1202) includes a flat surface and then determine that a virtual object (e.g., a cartoon character) is to be positioned on the flat surface. XR headset 1210 may generate an XR visualization in which the virtual object is at the determined position. For instance, XR headset 1210 may show the cartoon character sitting on the flat surface.

Figure 13:
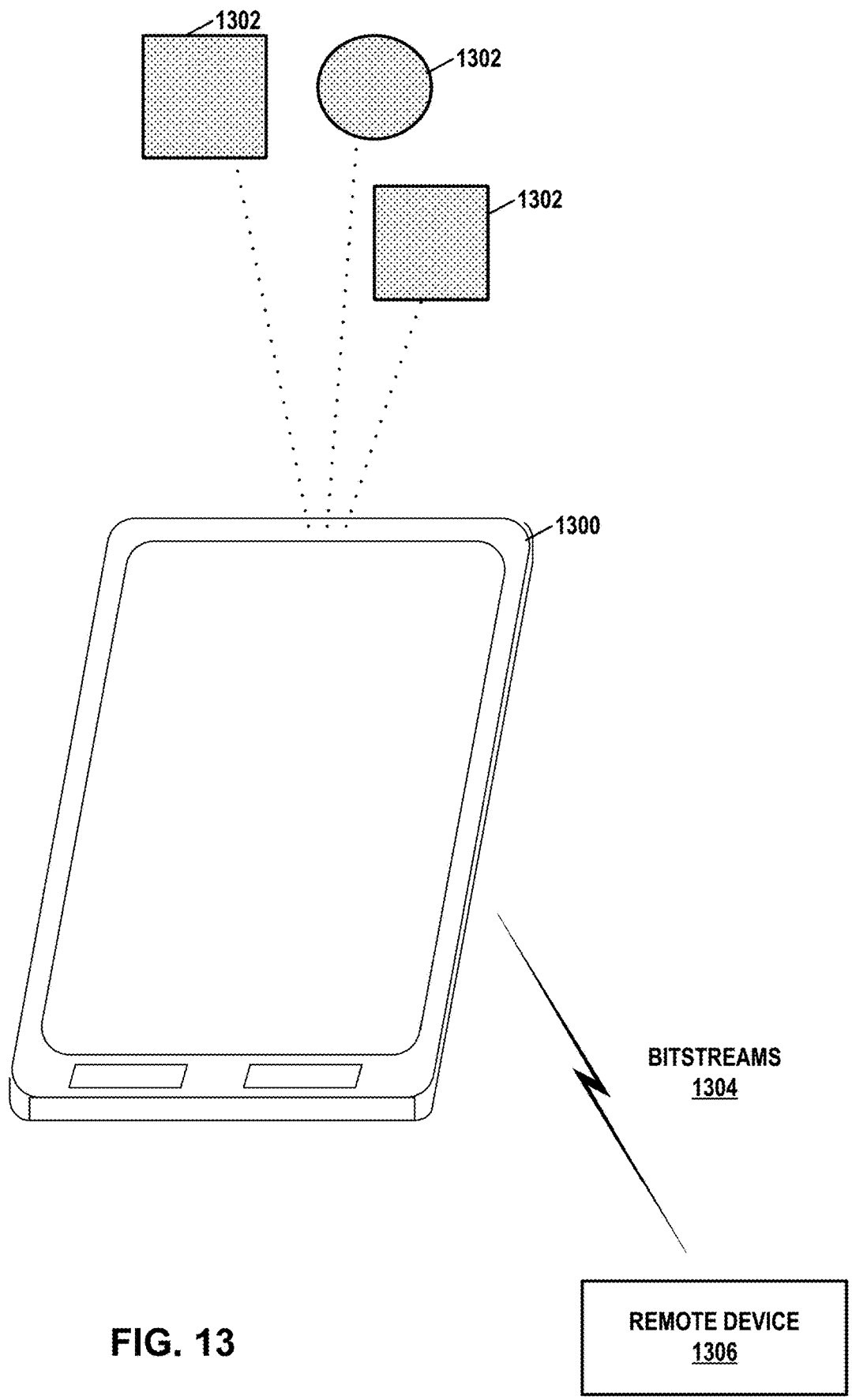
FIG. 13 is a conceptual diagram illustrating an example mobile device system in which one or more techniques of this disclosure may be used.

FIG. 13 is a conceptual diagram illustrating an example mobile device system in which one or more techniques of this disclosure may be used. In the example of FIG. 13, a mobile device 1300, such as a mobile phone or tablet computer, includes a depth detection sensor, such as a LIDAR system, that detects positions of points on objects 1302 in an environment of mobile device 1300. A data source of mobile device 1300 may use the signals generated by the depth detection sensor to generate a point cloud representation of objects 1302. Mobile device 1300 may include a G-PCC encoder (e.g., G-PCC encoder 200 of FIG. 1) that is configured to encode the point cloud to generate bitstreams 1304. In the example of FIG. 13, mobile device 1300 may transmit bitstreams to a remote device 1306, such as a server system or other mobile device. Remote device 1306 may decode bitstreams 1304 to reconstruct the point cloud. Remote device 1306 may use the point cloud for various purposes. For example, remote device 1306 may use the point cloud to generate a map of environment of mobile device 1300. For instance, remote device 1306 may generate a map of an interior of a building based on the reconstructed point cloud. In another example, remote device 1306 may generate imagery (e.g., computer graphics) based on the point cloud. For instance, remote device 1306 may use points of the point cloud as vertices of polygons and use color attributes of the points as the basis for shading the polygons. In some examples, remote device 1306 may perform facial recognition using the point cloud.

The following numbered clauses illustrate one or more aspects of the devices and techniques described in this disclosure.

Clause 1A. A method of processing point cloud data, the method comprising: receiving data representing a point cloud; and processing the data representing the point cloud according to any one or more techniques of this disclosure to generate the point cloud.

Clause 2A. A device for processing a point cloud, the device comprising one or more means for receiving data representing a point cloud and processing the data representing the point cloud according to any one or more techniques of this disclosure to generate the point cloud.

Clause 3A. The method of clause 1A or the device of clause 2A, wherein processing the data representing the point cloud according to any one or more techniques of this disclosure to generate the point cloud comprises either entirely or partially disabling angular modes.

Clause 4A. The device of clause 3A, wherein the one or more means comprise one or more processors implemented in circuitry.

Clause 5A. The device of any of clauses 2A-4A, further comprising a memory to store the data representing the point cloud.

Clause 6A. The device of any of clauses 2A-5A, wherein the device comprises a decoder.

Clause 7A. The device of any of clauses 2A-5A, wherein the device comprises an encoder.

Clause 8A. The device of any of clauses 2A-7A, further comprising a device to generate the point cloud.

Clause 9A. The device of any of clauses 2A-8A, further comprising a display to present imagery based on the point cloud.

Clause 10A. A computer-readable storage medium having stored thereon instructions that, when executed, cause one or more processors to receive data representing a point cloud and process the data representing the point cloud according to any one or more techniques of this disclosure to generate the point cloud.

Clause 1B. A device for decoding a bitstream that includes point cloud data, the device comprising: a memory to store the point cloud data; and one or more processors coupled to the memory and implemented in circuitry, the one or more processors configured to: determine, based on syntax signaled in the bitstream, that in-tree quantization is enabled for a node; determine, for the node based on the syntax signaled in the bitstream, that an angular mode is activated for the node; in response to in-tree quantization being enabled for the node, determine for the node a quantized value representing a coordinate position relative to an origin position; scale the quantized value without clipping to determine a scaled value representing the coordinate position relative to the origin position; and determine a context for context decoding a plane position syntax element for the angular mode based on the scaled value representing the coordinate position relative to the origin position.

Clause 2B. The device of clause 1B, wherein to determine the context for context decoding the plane position syntax element for the angular mode based on the scaled value representing the coordinate position relative to the origin position, the one or more processors are configured to: determine one or more laser characteristics based on the scaled value and the origin position; and decode the plane position syntax element for the angular mode based on the laser characteristics.

Clause 3B. The device of clause 2B, wherein to determine the context for context decoding the plane position syntax element for the angular mode based on the scaled value representing the coordinate position relative to the origin position, the one or more processors are further configured to determine a context index based on whether a laser beam with the determined one or more laser characteristics is above a first distance threshold, between the first distance threshold and a second distance threshold, between the second distance threshold and a third distance threshold, or below the third distance threshold.

Clause 4B. The device of clause 2B, wherein the plane position syntax element indicates a vertical plane position.

Clause 5B. The device of clause 2B, wherein the one or more laser characteristics include an elevation angle, a laser head offset, or an azimuth of a laser.

Clause 6B. The device of clause 1B, wherein the one or more processors are further configured to: arithmetically decode the plane position of the angular mode using a context indicated by the determined context.

Clause 7B. The device of clause 1B, wherein to scale the quantized value without clipping to determine the scaled value representing the coordinate position relative to the origin position, the one or more processors are configured to: determine a group of most significant bits (MSBs) and a group of least significant bits (LSBs); scale the LSBs without clipping to determine scaled LSBs; and add the scaled LSBs to the MSBs to determine the scaled value representing the coordinate position relative to the origin position.

Clause 8B. The device of clause 7B, wherein to scale the quantized value without clipping to determine the scaled value representing the coordinate position relative to the origin position, the one or more processors are configured to: determine an amount of shift for the MSBs based on a quantization parameter for the node; shift the MSBs based on the amount of shift; and add the scaled LSBs to the shifted MSBs to determine the scaled value representing the coordinate position relative to the origin position.

Clause 9B. The device of clause 6B, wherein the one or more processors are further configured to: receive, in the syntax signaled in the bitstream, an indication of a number of bits in the group of LSBs.

Clause 10B. The device of clause 1B, wherein the one or more processors are further configured to reconstruct the point cloud.

Clause 11B. The device of clause 10B, and wherein the one or more processors are configured to, as part of reconstructing the point cloud, determine positions of one or more points of the point cloud based on the plane position.

Clause 12B. The device of clause 11B, wherein the one or more processors are further configured to generate a map of an interior of a building based on the reconstructed point cloud.

Clause 13B. The device of clause 11B, wherein the one or more processors are further configured to perform an autonomous navigation operation based on the reconstructed point cloud.

Clause 14B. The device of clause 11B, wherein the one or more processors are further configured to generate computer graphics based on the reconstructed point cloud.

Clause 15B. The device of clause 11B, wherein the one or more processors are configured to: determine a position of a virtual object based on the reconstructed point cloud; and generate an extended reality (XR) visualization in which the virtual object is at the determined position.

Clause 16B. The device of clause 11B, further comprising a display to present imagery based on the reconstructed point cloud.

Clause 17B. The device of clause 1B, wherein the device is one of a mobile phone or tablet computer.

Clause 18B. The device of clause 1B, wherein the device is a vehicle.

Clause 19B. The device of clause 1B, wherein the device is an extended reality device.

Clause 20B. A method for decoding a bitstream that includes point cloud data, the method comprising: determining, based on syntax signaled in the bitstream, that in-tree quantization is enabled for a node; determining, for the node based on the syntax signaled in the bitstream, that an angular mode is activated for the node; in response to in-tree quantization being enabled for the node, determining for the node a quantized value representing a coordinate position relative to an origin position; scaling the quantized value without clipping to determine a scaled value representing the coordinate position relative to the origin position; and determining a context for context decoding a plane position syntax element for the angular mode based on the scaled value representing the coordinate position relative to the origin position.

Clause 21B. The method of clause 21B, wherein determining the context for context decoding the plane position syntax element for the angular mode based on the scaled value representing the coordinate position relative to the origin position comprises: determining one or more laser characteristics based on the scaled value and the origin position; and decoding the plane position syntax element for the angular mode based on the laser characteristics.

Clause 22B. The method of clause 21B, wherein determining the context for context decoding the plane position syntax element for the angular mode based on the scaled value representing the coordinate position relative to the origin position further comprises determining a context index based on whether a laser beam with the determined one or more laser characteristics is above a first distance threshold, between the first distance threshold and a second distance threshold, between the second distance threshold and a third distance threshold, or below the third distance threshold.

Clause 23B. The method of clause 21B, wherein the plane position syntax element indicates a vertical plane position.

Clause 24B. The method of clause 21B, wherein the one or more laser characteristics include an elevation angle, a laser head offset, or an azimuth of a laser.

Clause 25B. The method of clause 20B, further comprising: arithmetically decoding the plane position of the angular mode using a context indicated by the determined context.

Clause 26B. The method of clause 20B, wherein scaling the quantized value without clipping to determine the scaled value representing the coordinate position relative to the origin position comprises: determining a group of most significant bits (MSBs) and a group of least significant bits (LSBs); scaling the LSBs without clipping to determine scaled LSBs; and adding the scaled LSBs to the MSBs to determine the scaled value representing the coordinate position relative to the origin position.

Clause 27B. The method of clause 26B, wherein scaling the quantized value without clipping to determine the scaled value representing the coordinate position relative to the origin position comprises: determining an amount of shift for the MSBs based on a quantization parameter for the node; shifting the MSBs based on the amount of shift; and adding the scaled LSBs to the shifted MSBs to determine the scaled value representing the coordinate position relative to the origin position.

Clause 28B. The method of clause 25B, further comprising: receiving, in the syntax signaled in the bitstream, an indication of a number of bits in the group of LSBs.

Clause 29B. The method of clause 20B, further comprising: reconstructing the point cloud.

Clause 30B. The method of clause 29B, wherein reconstructing the point cloud comprises determining positions of one or more points of the point cloud based on the plane position.

Clause 31B. The method of clause 29B, further comprising: generating a map of an interior of a building based on the reconstructed point cloud.

Clause 32B. The method of clause 29B, further comprising: performing an autonomous navigation operation based on the reconstructed point cloud.

Clause 33B. The method of clause 29B, further comprising: generating computer graphics based on the reconstructed point cloud.

Clause 34B. The method of clause 29B, further comprising: determining a position of a virtual object based on the reconstructed point cloud; and generating an extended reality (XR) visualization in which the virtual object is at the determined position.

Clause 35B. A device for encoding a bitstream that includes point cloud data, the device comprising: a memory to store the point cloud data; and one or more processors coupled to the memory and implemented in circuitry, the one or more processors configured to: determine that in-tree quantization is enabled for a node; determine that an angular mode is activated for the node; in response to in-tree quantization being enabled for the node, determine for the node a quantized value representing a coordinate position relative to an origin position; scale the quantized value without clipping to determine a scaled value representing the coordinate position relative to the origin position; and determine a context for context encoding a plane position syntax element for the angular mode based on the scaled value representing the coordinate position relative to the origin position.

Clause 36B. The device of clause 35B, wherein to determine the context for context encoding the plane position syntax element for the angular mode based on the scaled value representing the coordinate position relative to the origin position, the one or more processors are configured to: determine one or more laser characteristics based on the scaled value and the origin position; and decoding the plane position syntax element for the angular mode based on the laser characteristics.

Clause 37B. The device of clause 36B, wherein to determine the context for context encoding the plane position syntax element for the angular mode based on the scaled value representing the coordinate position relative to the origin position, the one or more processors are further configured to determine a context index based on whether a laser beam with the determined one or more laser characteristics is above a first distance threshold, between the first distance threshold and a second distance threshold, between the second distance threshold and a third distance threshold, or below the third distance threshold.

Clause 38B. The device of clause 36B, wherein the plane position syntax element indicates a vertical plane position.

Clause 39B. The device of clause 36B, wherein the one or more laser characteristics included an elevation angle, a laser head offset, or an azimuth of a laser.

Clause 40B. The device of clause 35B, wherein the one or more processors are further configured to: arithmetically encode the plane position of the angular mode using a context indicated by the determined context.

Clause 41B. The device of clause 35B, wherein to scale the quantized value without clipping to determine the scaled value representing the coordinate position relative to the origin position, the one or more processors are configured to: determine a group of most significant bits (MSBs) and a group of least significant bits (LSBs); scale the LSBs without clipping to determine scaled LSBs; and add the scaled LSBs to the MSBs to determine the scaled value representing the coordinate position relative to the origin position.

Clause 42B. The device of clause 41B, wherein to scale the quantized value without clipping to determine the scaled value representing the coordinate position relative to the origin position, the one or more processors are configured to: determining an amount of shift for the MSBs based on a quantization parameter for the node; shift the MSBs based on the amount of shift; and add the scaled LSBs to the shifted MSBs to determine the scaled value representing the coordinate position relative to the origin position.

Clause 43B. The device of clause 35B, wherein the one or more processors are further configured to reconstruct the point cloud.

Clause 44B. The device of clause 35B, wherein to reconstruct the point cloud, the one or more processors are further configured to determine positions of one or more points of the point cloud based on the plane position.

Clause 45B. The device of clause 35B, wherein the device is one of a mobile phone or tablet computer.

Clause 46B. The device of clause 35B, wherein the device is a vehicle.

Clause 47B. The device of clause 35B, wherein the device is an extended reality device.

Clause 48B. A method for encoding a bitstream that includes point cloud data, the method comprising: determining that in-tree quantization is enabled for a node; determining that an angular mode is activated for the node; in response to in-tree quantization being enabled for the node, determining for the node a quantized value representing a coordinate position relative to an origin position; scaling the quantized value without clipping to determine a scaled value representing the coordinate position relative to the origin position; and determining a context for context encoding a plane position syntax element for the angular mode based on the scaled value representing the coordinate position relative to the origin position.

Clause 49B. The method of clause 48B, wherein determining the context for context encoding the plane position syntax element for the angular mode based on the scaled value representing the coordinate position relative to the origin position comprises: determining one or more laser characteristics based on the scaled value and the origin position; and decoding the plane position syntax element for the angular mode based on the laser characteristics.

Clause 50B. The method of clause 49B, wherein determining the context for context encoding the plane position syntax element for the angular mode based on the scaled value representing the coordinate position relative to the origin position further comprises determining a context index based on whether a laser beam with the determined one or more laser characteristics is above a first distance threshold, between the first distance threshold and a second distance threshold, between the second distance threshold and a third distance threshold, or below the third distance threshold.

Clause 51B. The method of clause 49B, wherein the plane position syntax element indicates a vertical plane position.

Clause 52B. The method of clause 49B, wherein the one or more laser characteristics included an elevation angle, a laser head offset, or an azimuth of a laser.

Clause 53B. The method of clause 48B, further comprising: arithmetically encode the plane position of the angular mode using a context indicated by the determined context.

Clause 54B. The method of clause 48B, wherein scaling the quantized value without clipping to determine the scaled value representing the coordinate position relative to the origin position comprises: determining a group of most significant bits (MSBs) and a group of least significant bits (LSBs); scaling the LSBs without clipping to determine scaled LSBs; and adding the scaled LSBs to the MSBs to determine the scaled value representing the coordinate position relative to the origin position.

Clause 55B. The method of clause 54B, scaling the quantized value without clipping to determine the scaled value representing the coordinate position relative to the origin position comprises: determining an amount of shift for the MSBs based on a quantization parameter for the node; shifting the MSBs based on the amount of shift; and adding the scaled LSBs to the shifted MSBs to determine the scaled value representing the coordinate position relative to the origin position.

Clause 56B. The method of clause 48B, further comprising: reconstructing the point cloud.

Clause 57B. The method of clause 56B, wherein reconstructing the point cloud comprises determining positions of one or more points of the point cloud based on the plane position.

Clause 58B. A computer-readable storage medium storing instructions that when executed by one or more processors cause the one or more processors to: determine, based on syntax signaled in the bitstream, that in-tree quantization is enabled for a node; determine, for the node based on the syntax signaled in the bitstream, that an angular mode is activated for the node; in response to in-tree quantization being enabled for the node, determine for the node a quantized value representing a coordinate position relative to an origin position; scale the quantized value without clipping to determine a scaled value representing the coordinate position relative to the origin position; and determine a context for context decoding a plane position syntax element for the angular mode based on the scaled value representing the coordinate position relative to the origin position.

Clause 59B. A device for decoding a bitstream that includes point cloud data, the device comprising: means for determining, based on syntax signaled in the bitstream, that in-tree quantization is enabled for a node; means for determining, for the node based on the syntax signaled in the bitstream, that an angular mode is activated for the node; means for determining for the node a quantized value representing a coordinate position relative to an origin position in response to in-tree quantization being enabled for the node; means for scaling the quantized value without clipping to determine a scaled value representing the coordinate position relative to the origin position; and means for determining a context for context decoding a plane position syntax element for the angular mode based on the scaled value representing the coordinate position relative to the origin position.

Clause 1C. A device for decoding a bitstream that includes point cloud data, the device comprising: a memory to store the point cloud data; and one or more processors coupled to the memory and implemented in circuitry, the one or more processors configured to: determine, based on syntax signaled in the bitstream, that in-tree quantization is enabled for a node; determine, for the node based on the syntax signaled in the bitstream, that an angular mode is activated for the node; in response to in-tree quantization being enabled for the node, determine for the node a quantized value representing a coordinate position relative to an origin position; scale the quantized value without clipping to determine a scaled value representing the coordinate position relative to the origin position; and determine a context for context decoding a plane position syntax element for the angular mode based on the scaled value representing the coordinate position relative to the origin position.

Clause 2C. The device of clause 1C, wherein to determine the context for context decoding the plane position syntax element for the angular mode based on the scaled value representing the coordinate position relative to the origin position, the one or more processors are configured to: determine one or more laser characteristics based on the scaled value and the origin position; and decode the plane position syntax element for the angular mode based on the laser characteristics.

Clause 3C. The device of clause 2C, wherein to determine the context for context decoding the plane position syntax element for the angular mode based on the scaled value representing the coordinate position relative to the origin position, the one or more processors are further configured to determine a context index based on whether a laser beam with the determined one or more laser characteristics is above a first distance threshold, between the first distance threshold and a second distance threshold, between the second distance threshold and a third distance threshold, or below the third distance threshold.

Clause 4C. The device of any of clauses 1C-3C, wherein the plane position syntax element indicates a vertical plane position.

Clause 5C. The device of any of clauses 2C-4C, wherein the one or more laser characteristics include an elevation angle, a laser head offset, or an azimuth of a laser.

Clause 6C. The device of any of clauses 1C-5C, wherein the one or more processors are further configured to: arithmetically decode the plane position of the angular mode using a context indicated by the determined context.

Clause 7C. The device of any of clauses 1C-6C, wherein to scale the quantized value without clipping to determine the scaled value representing the coordinate position relative to the origin position, the one or more processors are configured to: determine a group of most significant bits (MSBs) and a group of least significant bits (LSBs); scale the LSBs without clipping to determine scaled LSBs; and add the scaled LSBs to the MSBs to determine the scaled value representing the coordinate position relative to the origin position.

Clause 8C. The device of clause 7C, wherein to scale the quantized value without clipping to determine the scaled value representing the coordinate position relative to the origin position, the one or more processors are configured to: determine an amount of shift for the MSBs based on a quantization parameter for the node; shift the MSBs based on the amount of shift; and add the scaled LSBs to the shifted MSBs to determine the scaled value representing the coordinate position relative to the origin position.

Clause 9C. The device of any of clauses 6C-8C, wherein the one or more processors are further configured to: receive, in the syntax signaled in the bitstream, an indication of a number of bits in the group of LSBs.

Clause 10C. The device of any of clauses 1C-9C, wherein the one or more processors are further configured to reconstruct the point cloud.

Clause 11C. The device of clause 10C, and wherein the one or more processors are configured to, as part of reconstructing the point cloud, determine positions of one or more points of the point cloud based on the plane position.

Clause 12C. The device of clause 11C, wherein the one or more processors are further configured to generate a map of an interior of a building based on the reconstructed point cloud.

Clause 13C. The device of clause 11C, wherein the one or more processors are further configured to perform an autonomous navigation operation based on the reconstructed point cloud.

Clause 14C. The device of clause 11C, wherein the one or more processors are further configured to generate computer graphics based on the reconstructed point cloud.

Clause 15C. The device of clause 11C, wherein the one or more processors are configured to: determine a position of a virtual object based on the reconstructed point cloud; and generate an extended reality (XR) visualization in which the virtual object is at the determined position.

Clause 16C. The device of any of clauses 11C-15C, further comprising a display to present imagery based on the reconstructed point cloud.

Clause 17C. The device of any of clauses 1C-16C, wherein the device is one of a mobile phone or tablet computer.

Clause 18C. The device of any of clauses 1C-16C, wherein the device is a vehicle.

Clause 19C. The device of any of clauses 1C-16C, wherein the device is an extended reality device.

Clause 20C. A method for decoding a bitstream that includes point cloud data, the method comprising: determining, based on syntax signaled in the bitstream, that in-tree quantization is enabled for a node; determining, for the node based on the syntax signaled in the bitstream, that an angular mode is activated for the node; in response to in-tree quantization being enabled for the node, determining for the node a quantized value representing a coordinate position relative to an origin position; scaling the quantized value without clipping to determine a scaled value representing the coordinate position relative to the origin position; and determining a context for context decoding a plane position syntax element for the angular mode based on the scaled value representing the coordinate position relative to the origin position.

Clause 21C. The method of clause 20C, wherein determining the context for context decoding the plane position syntax element for the angular mode based on the scaled value representing the coordinate position relative to the origin position comprises: determining one or more laser characteristics based on the scaled value and the origin position; and decoding the plane position syntax element for the angular mode based on the laser characteristics.

Clause 22C. The method of clause 21C, wherein determining the context for context decoding the plane position syntax element for the angular mode based on the scaled value representing the coordinate position relative to the origin position further comprises determining a context index based on whether a laser beam with the determined one or more laser characteristics is above a first distance threshold, between the first distance threshold and a second distance threshold, between the second distance threshold and a third distance threshold, or below the third distance threshold.

Clause 23C. The method of any of clauses 20C-22C, wherein the plane position syntax element indicates a vertical plane position.

Clause 24C. The method of any of clauses 21C-23C, wherein the one or more laser characteristics include an elevation angle, a laser head offset, or an azimuth of a laser.

Clause 25C. The method of any of clauses 20C-24C, further comprising: arithmetically decoding the plane position of the angular mode using a context indicated by the determined context.

Clause 26C. The method of any of clauses 20C-25C, wherein scaling the quantized value without clipping to determine the scaled value representing the coordinate position relative to the origin position comprises: determining a group of most significant bits (MSBs) and a group of least significant bits (LSBs); scaling the LSBs without clipping to determine scaled LSBs; and adding the scaled LSBs to the MSBs to determine the scaled value representing the coordinate position relative to the origin position.

Clause 27C. The method of clause 26C, wherein scaling the quantized value without clipping to determine the scaled value representing the coordinate position relative to the origin position comprises: determining an amount of shift for the MSBs based on a quantization parameter for the node; shifting the MSBs based on the amount of shift; and adding the scaled LSBs to the shifted MSBs to determine the scaled value representing the coordinate position relative to the origin position.

Clause 28C. The method of any of clauses 25C-27C, further comprising: receiving, in the syntax signaled in the bitstream, an indication of a number of bits in the group of LSBs.

Clause 29C. The method of any of clauses 20C-28C, further comprising: reconstructing the point cloud.

Clause 30C. The method of clause 29C, wherein reconstructing the point cloud comprises determining positions of one or more points of the point cloud based on the plane position.

Clause 31C. The method of clause 29C, further comprising: generating a map of an interior of a building based on the reconstructed point cloud.

Clause 32C. The method of clause 29C, further comprising: performing an autonomous navigation operation based on the reconstructed point cloud.

Clause 33C. The method of clause 29C, further comprising: generating computer graphics based on the reconstructed point cloud.

Clause 34C. The method of clause 29C, further comprising: determining a position of a virtual object based on the reconstructed point cloud; and generating an extended reality (XR) visualization in which the virtual object is at the determined position.

Clause 35C. A device for encoding a bitstream that includes point cloud data, the device comprising: a memory to store the point cloud data; and one or more processors coupled to the memory and implemented in circuitry, the one or more processors configured to: determine that in-tree quantization is enabled for a node; determine that an angular mode is activated for the node; in response to in-tree quantization being enabled for the node, determine for the node a quantized value representing a coordinate position relative to an origin position; scale the quantized value without clipping to determine a scaled value representing the coordinate position relative to the origin position; and determine a context for context encoding a plane position syntax element for the angular mode based on the scaled value representing the coordinate position relative to the origin position.

Clause 36C. The device of clause 35C, wherein to determine the context for context encoding the plane position syntax element for the angular mode based on the scaled value representing the coordinate position relative to the origin position, the one or more processors are configured to: determine one or more laser characteristics based on the scaled value and the origin position; and decoding the plane position syntax element for the angular mode based on the laser characteristics.

Clause 37C. The device of clause 36C, wherein to determine the context for context encoding the plane position syntax element for the angular mode based on the scaled value representing the coordinate position relative to the origin position, the one or more processors are further configured to determine a context index based on whether a laser beam with the determined one or more laser characteristics is above a first distance threshold, between the first distance threshold and a second distance threshold, between the second distance threshold and a third distance threshold, or below the third distance threshold.

Clause 38C. The device of any of clauses 35C-37C, wherein the plane position syntax element indicates a vertical plane position.

Clause 39C. The device of any of clauses 36C-38C, wherein the one or more laser characteristics included an elevation angle, a laser head offset, or an azimuth of a laser.

Clause 40C. The device of any of clauses 35C-39C, wherein the one or more processors are further configured to: arithmetically encode the plane position of the angular mode using a context indicated by the determined context.

Clause 41C. The device of any of clauses 35C-40C, wherein to scale the quantized value without clipping to determine the scaled value representing the coordinate position relative to the origin position, the one or more processors are configured to: determine a group of most significant bits (MSBs) and a group of least significant bits (LSBs); scale the LSBs without clipping to determine scaled LSBs; and add the scaled LSBs to the MSBs to determine the scaled value representing the coordinate position relative to the origin position.

Clause 42C. The device of clause 41C, wherein to scale the quantized value without clipping to determine the scaled value representing the coordinate position relative to the origin position, the one or more processors are configured to: determining an amount of shift for the MSBs based on a quantization parameter for the node; shift the MSBs based on the amount of shift; and add the scaled LSBs to the shifted MSBs to determine the scaled value representing the coordinate position relative to the origin position.

Clause 43C. The device of any of clauses 35C-42C, wherein the one or more processors are further configured to reconstruct the point cloud.

Clause 44C. The device of any of clause 35C-43C, wherein to reconstruct the point cloud, the one or more processors are further configured to determine positions of one or more points of the point cloud based on the plane position.

Clause 45C. The device of any of clauses 35C-44C, wherein the device is one of a mobile phone or tablet computer.

Clause 46C. The device of any of clauses 35C-44C, wherein the device is a vehicle.

Clause 47C. The device of any of clauses 35C-44C, wherein the device is an extended reality device.

Clause 48C. A method for encoding a bitstream that includes point cloud data, the method comprising: determining that in-tree quantization is enabled for a node; determining that an angular mode is activated for the node; in response to in-tree quantization being enabled for the node, determining for the node a quantized value representing a coordinate position relative to an origin position; scaling the quantized value without clipping to determine a scaled value representing the coordinate position relative to the origin position; and determining a context for context encoding a plane position syntax element for the angular mode based on the scaled value representing the coordinate position relative to the origin position.

Clause 49C. The method of clause 48C, wherein determining the context for context encoding the plane position syntax element for the angular mode based on the scaled value representing the coordinate position relative to the origin position comprises: determining one or more laser characteristics based on the scaled value and the origin position; and decoding the plane position syntax element for the angular mode based on the laser characteristics.

Clause 50C. The method of clause 49C, wherein determining the context for context encoding the plane position syntax element for the angular mode based on the scaled value representing the coordinate position relative to the origin position further comprises determining a context index based on whether a laser beam with the determined one or more laser characteristics is above a first distance threshold, between the first distance threshold and a second distance threshold, between the second distance threshold and a third distance threshold, or below the third distance threshold.

Clause 51C. The method of any of clauses 48C-50C, wherein the plane position syntax element indicates a vertical plane position.

Clause 52C. The method of any of clauses 49C-51C, wherein the one or more laser characteristics included an elevation angle, a laser head offset, or an azimuth of a laser.

Clause 53C. The method of any of clauses 48C-52C, further comprising: arithmetically encode the plane position of the angular mode using a context indicated by the determined context.

Clause 54C. The method of any of clauses 48C-53C, wherein scaling the quantized value without clipping to determine the scaled value representing the coordinate position relative to the origin position comprises: determining a group of most significant bits (MSBs) and a group of least significant bits (LSBs); scaling the LSBs without clipping to determine scaled LSBs; and adding the scaled LSBs to the MSBs to determine the scaled value representing the coordinate position relative to the origin position.

Clause 55C. The method of clause 54C, scaling the quantized value without clipping to determine the scaled value representing the coordinate position relative to the origin position comprises: determining an amount of shift for the MSBs based on a quantization parameter for the node; shifting the MSBs based on the amount of shift; and adding the scaled LSBs to the shifted MSBs to determine the scaled value representing the coordinate position relative to the origin position.

Clause 56C. The method of any of clauses 48C-55C, further comprising: reconstructing the point cloud.

Clause 57C. The method of clause 56C, wherein reconstructing the point cloud comprises determining positions of one or more points of the point cloud based on the plane position.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for decoding a bitstream that includes point cloud data, the device comprising:
   a memory to store the point cloud data; and
   one or more processors coupled to the memory and implemented in circuitry, the one or more processors configured to:
      determine, based on syntax signaled in the bitstream, that quantization is enabled for decoding geometry of the point cloud data;
      determine, based on the syntax signaled in the bitstream, that an angular mode is enabled for decoding the geometry of the point cloud data;
      in response to the quantization being enabled and the angular mode being enabled, determine for a node a quantized value representing a coordinate position in a three dimensional (3D) space containing a point cloud relative to an origin position;
      scale the quantized value without clipping to determine a scaled value representing the coordinate position in the 3D space relative to the origin position;
      determine a context based on the scaled value representing the coordinate position in the 3D space relative to the origin position;
      perform context-based arithmetic decoding based on the context to determine a value for a plane position syntax element for the angular mode;
      determine a position of a plane within the 3D space based on the value for the plane position syntax element; and
      determine occupancy of nodes within the 3D space based on the position of the plane within the 3D space.

2. The device of claim 1, wherein to determine the context based on the scaled value representing the coordinate position in the 3D space relative to the origin position, the one or more processors are configured to:
   determine one or more laser characteristics based on the scaled value and the origin position; and
   decode the plane position syntax element for the angular mode based on the laser characteristics.

3. The device of claim 2, wherein to determine the context based on the scaled value representing the coordinate position in the 3D relative to the origin position, the one or more processors are further configured to determine a context index based on whether a laser beam with the determined one or more laser characteristics is above a first distance threshold, between the first distance threshold and a second distance threshold, between the second distance threshold and a third distance threshold, or below the third distance threshold.

4. The device of claim 2, wherein the one or more laser characteristics include an elevation angle, a laser head offset, or an azimuth of a laser.

5. The device of claim 1, wherein the plane position syntax element indicates a vertical plane position.

6. The device of claim 1, wherein to scale the quantized value without clipping to determine the scaled value representing the coordinate position in the 3D space relative to the origin position, the one or more processors are configured to:
  determine a group of most significant bits (MSBs) and a group of least significant bits (LSBs);
  scale the LSBs without clipping to determine scaled LSBs; and
  add the scaled LSBs to the MSBs to determine the scaled value representing the coordinate position in the 3D space relative to the origin position.

7. The device of claim 6, wherein to scale the quantized value without clipping to determine the scaled value representing the coordinate position in the 3D space relative to the origin position, the one or more processors are configured to:
  determine an amount of shift for the MSBs based on a quantization parameter for the node;
  shift the MSBs based on the amount of shift; and
  add the scaled LSBs to the shifted MSBs to determine the scaled value representing the coordinate position in the 3D space relative to the origin position.

8. The device of claim 6, wherein the one or more processors are further configured to receive, in the syntax signaled in the bitstream, an indication of a number of bits in the group of LSBs.

9. The device of claim 1, wherein the one or more processors are further configured to:
  determine an occupied region of an octree based on the value for the plane position syntax element for the angular mode; and
  reconstruct a point cloud of the occupied region from the point cloud data.

10. The device of claim 9, wherein the one or more processors are configured to, as part of reconstructing the point cloud, determine positions of one or more points of the point cloud in the occupied region.

11. The device of claim 10, wherein the one or more processors are further configured to generate a map of an interior of a building based on the point cloud.

12. The device of claim 10, wherein the one or more processors are further configured to perform an autonomous navigation operation based on the point cloud.

13. The device of claim 10, wherein the one or more processors are further configured to generate computer graphics based on the point cloud.

14. The device of claim 10, wherein the one or more processors are configured to:
  determine a position of a virtual object based on the point cloud; and
  generate an extended reality (XR) visualization in which the virtual object is at the determined position.

15. The device of claim 10, further comprising a display to present imagery based on the point cloud.

16. The device of claim 1, wherein the device is a mobile phone or a tablet computer.

17. The device of claim 1, wherein the device is a vehicle.

18. The device of claim 1, wherein the device is an extended reality device.

19. A method for decoding a bitstream that includes point cloud data, the method comprising:
  determining, based on syntax signaled in the bitstream, that quantization is enabled for decoding geometry of the point cloud data;
  determining, based on the syntax signaled in the bitstream, that an angular mode is enabled for decoding the geometry of the point cloud data;
  in response to the quantization being enabled and the angular mode being enabled, determining for a node a quantized value representing a coordinate position in a three dimensional (3D) space containing a point cloud relative to an origin position;
  scaling the quantized value without clipping to determine a scaled value representing the coordinate position in the 3D space relative to the origin position;
  determining a context based on the scaled value representing the coordinate position in the 3D space relative to the origin position;
  performing context-based arithmetic decoding based on the context to determine a value for a plane position syntax element for the angular mode;
  determining a position of a plane within the 3D space based on the value for the plane position syntax element; and
  determining occupancy of nodes within the 3D space based on the position of the plane within the 3D space.

20. The method of claim 19, wherein determining the context based on the scaled value representing the coordinate position in the 3D space relative to the origin position comprises:
  determining one or more laser characteristics based on the scaled value and the origin position; and
  decoding the plane position syntax element for the angular mode based on the laser characteristics.

21. The method of claim 20, wherein determining the context based on the scaled value representing the coordinate position in the 3D space relative to the origin position further comprises determining a context index based on whether a laser beam with the determined one or more laser characteristics is above a first distance threshold, between the first distance threshold and a second distance threshold, between the second distance threshold and a third distance threshold, or below the third distance threshold.

22. The method of claim 20, wherein the one or more laser characteristics include an elevation angle, a laser head offset, or an azimuth of a laser.

23. The method of claim 19, wherein the plane position syntax element indicates a vertical plane position.

24. The method of claim 19, wherein scaling the quantized value without clipping to determine the scaled value representing the coordinate position in the 3D space relative to the origin position comprises:
  determining a group of most significant bits (MSBs) and a group of least significant bits (LSBs);
  scaling the LSBs without clipping to determine scaled LSBs; and
  adding the scaled LSBs to the MSBs to determine the scaled value representing the coordinate position in the 3D space relative to the origin position.

25. The method of claim 24, wherein scaling the quantized value without clipping to determine the scaled value representing the coordinate position in the 3D space relative to the origin position comprises:
  determining an amount of shift for the MSBs based on a quantization parameter for the node;
  shifting the MSBs based on the amount of shift; and adding the scaled LSBs to the shifted MSBs to determine the scaled value representing the coordinate position in the 3D space relative to the origin position.

26. The method of claim 24, further comprising receiving, in the syntax signaled in the bitstream, an indication of a number of bits in the group of LSBs.

27. The method of claim 19, further comprising:
determining an occupied region of an octree based on the value for the plane position syntax element for the angular mode; and
reconstructing a point cloud of the occupied region from the point cloud data.

28. The method of claim 27, wherein reconstructing the point cloud comprises determining positions of one or more points of the point cloud in the occupied region.

29. The method of claim 27, further comprising generating a map of an interior of a building based on the point cloud.

30. The method of claim 27, further comprising performing an autonomous navigation operation based on the point cloud.

31. The method of claim 27, further comprising generating computer graphics based on the point cloud.

32. The method of claim 27, further comprising:
determining a position of a virtual object based on the point cloud; and
generating an extended reality (XR) visualization in which the virtual object is at the determined position.

33. A device for encoding a bitstream that includes point cloud data, the device comprising:
a memory to store the point cloud data; and
one or more processors coupled to the memory and implemented in circuitry, the one or more processors configured to:
determine occupancy of nodes within a three dimensional (3D) space containing a point cloud;
determine a position of a plane within the 3D space based on the occupancy of the nodes;
determine that quantization is enabled for a node;
determine that an angular mode is activated for the node;
in response to quantization being enabled for the node and the angular mode being activated for the node, determine for the node a quantized value representing a coordinate position relative to an origin position in the 3D space;
scale the quantized value without clipping to determine a scaled value representing the coordinate position relative to the origin position in the 3D space;
determine a context based on the scaled value representing the coordinate position relative to the origin position in the 3D space; and
perform context-based arithmetic encoding based on the context to encode a value for a plane position syntax element for the angular mode.

34. The device of claim 33, wherein to determine the context based on the scaled value representing the coordinate position relative to the origin position, the one or more processors are configured to:
determine one or more laser characteristics based on the scaled value and the origin position; and
decoding the plane position syntax element for the angular mode based on the laser characteristics.

35. The device of claim 34, wherein to determine the context for performing the context-based arithmetic encoding of the plane position syntax element for the angular mode based on the scaled value representing the coordinate position relative to the origin position, the one or more processors are further configured to determine a context index based on whether a laser beam with the determined one or more laser characteristics is above a first distance threshold, between the first distance threshold and a second distance threshold, between the second distance threshold and a third distance threshold, or below the third distance threshold.

36. The device of claim 34, wherein the one or more laser characteristics included an elevation angle, a laser head offset, or an azimuth of a laser.

37. The device of claim 33, wherein the plane position syntax element indicates a vertical plane position.

38. The device of claim 33, wherein to scale the quantized value without clipping to determine the scaled value representing the coordinate position relative to the origin position, the one or more processors are configured to:
determine a group of most significant bits (MSBs) and a group of least significant bits (LSBs);
scale the LSBs without clipping to determine scaled LSBs; and
add the scaled LSBs to the MSBs to determine the scaled value representing the coordinate position relative to the origin position.

39. The device of claim 38, wherein to scale the quantized value without clipping to determine the scaled value representing the coordinate position relative to the origin position, the one or more processors are configured to:
determining an amount of shift for the MSBs based on a quantization parameter for the node;
shift the MSBs based on the amount of shift; and
add the scaled LSBs to the shifted MSBs to determine the scaled value representing the coordinate position relative to the origin position.

40. The device of claim 33, wherein the one or more processors are further configured to reconstruct a point cloud from the point cloud data.

41. The device of claim 33, wherein to reconstruct the point cloud, the one or more processors are further configured to determine positions of one or more points of the point cloud based on the plane position.

42. The device of claim 33, wherein the device is a mobile phone or a tablet computer.

43. The device of claim 33, wherein the device is a vehicle.

44. The device of claim 33, wherein the device is an extended reality device.

45. A method for encoding a bitstream that includes point cloud data, the method comprising:
determining occupancy of nodes within a three dimensional (3D) space containing a point cloud;
determining a position of a plane within the 3D space based on the occupancy of the nodes;
determining that quantization is enabled for a node;
determining that an angular mode is activated for the node;
in response to quantization being enabled for the node and the angular mode being activated for the node, determining for the node a quantized value representing a coordinate position relative to an origin position in the 3D space;
scaling the quantized value without clipping to determine a scaled value representing the coordinate position relative to the origin position in the 3D space;
determining a context based on the scaled value representing the coordinate position relative to the origin position in the 3D space; and performing context-based arithmetic encoding based on the context to encode a value for a plane position syntax element for the angular mode, wherein the plane position syntax element indicates a position of the plane within the 3D space.

46. The method of claim 45, wherein determining the context based on the scaled value representing the coordinate position relative to the origin position comprises:
determining one or more laser characteristics based on the scaled value and the origin position; and
decoding the plane position syntax element for the angular mode based on the laser characteristics.

47. The method of claim 46, wherein determining the context for performing the context-based arithmetic encoding of the plane position syntax element for the angular mode based on the scaled value representing the coordinate position relative to the origin position further comprises determining a context index based on whether a laser beam with the determined one or more laser characteristics is above a first distance threshold, between the first distance threshold and a second distance threshold, between the second distance threshold and a third distance threshold, or below the third distance threshold.

48. The method of claim 46, wherein the one or more laser characteristics included an elevation angle, a laser head offset, or an azimuth of a laser.

49. The method of claim 45, wherein the plane position syntax element indicates a vertical plane position.

50. The method of claim 45, wherein scaling the quantized value without clipping to determine the scaled value representing the coordinate position relative to the origin position comprises:
determining a group of most significant bits (MSBs) and a group of least significant bits (LSBs);
scaling the LSBs without clipping to determine scaled LSBs; and
adding the scaled LSBs to the MSBs to determine the scaled value representing the coordinate position relative to the origin position.

51. The method of claim 50, scaling the quantized value without clipping to determine the scaled value representing the coordinate position relative to the origin position comprises:
determining an amount of shift for the MSBs based on a quantization parameter for the node;
shifting the MSBs based on the amount of shift; and
adding the scaled LSBs to the shifted MSBs to determine the scaled value representing the coordinate position relative to the origin position.

52. The method of claim 45, further comprising reconstructing a point cloud from the point cloud data.

53. The method of claim 52, wherein reconstructing the point cloud comprises determining positions of one or more points of the point cloud based on the plane position.

54. A computer-readable storage medium storing instructions that when executed by one or more processors cause the one or more processors to:

determine, based on syntax signaled in a bitstream that includes point cloud data, that quantization is enabled for decoding geometry of the point cloud data;
determine, based on the syntax signaled in the bitstream, that an angular mode is enabled for decoding the geometry of the point cloud data;
in response to the quantization being enabled and the angular mode being enabled, determine for a node a quantized value representing a coordinate position in a three dimensional (3D) space containing a point cloud relative to an origin position;
scale the quantized value without clipping to determine a scaled value representing the coordinate position in the 3D space relative to the origin position;
determine a context based on the scaled value representing the coordinate position in the 3D space relative to the origin position;
perform context-based arithmetic decoding based on the context to determine a value for a plane position syntax element for the angular mode;
determine a position of a plane within the 3D space based on the value for the plane position syntax element; and
determine occupancy of nodes within the 3D space based on the position of the plane within the 3D space.

55. A device for decoding a bitstream that includes point cloud data, the device comprising:
means for determining, based on syntax signaled in the bitstream, that quantization is enabled for decoding geometry of the point cloud data;
means for determining, based on the syntax signaled in the bitstream, that an angular mode is enabled for decoding the geometry of the point cloud data;
means for determining for a node a quantized value representing a coordinate position relative to an origin position in a three dimensional (3D) space containing a point cloud in response to the quantization being enabled and the angular mode being enabled;
means for scaling the quantized value without clipping to determine a scaled value representing the coordinate position in the 3D space relative to the origin position; and
means for determining a context based on the scaled value representing the coordinate position in the 3D space relative to the origin position;
means for performing context-based arithmetic decoding based on the context to determine a value for a plane position syntax element for the angular mode;
means for determining a position of a plane within the 3D space based on the value for the plane position syntax element; and
means for determining occupancy of nodes within the 3D space based on the position of the plane within the 3D space.

* * * * *